United States Patent [19]
Katoh et al.

[11] Patent Number: 6,142,378
[45] Date of Patent: *Nov. 7, 2000

[54] REPLACEABLE EMISSION-CONDENSING UNIT FOR A BAR CODE READER

[75] Inventors: Hiroaki Katoh; Ichiro Sebata; Toshitaka Aoki, all of Kawasaki; Kouta Goto, Yamanashi, all of Japan

[73] Assignee: Fujitsu Limited, Kawasaki, Japan

[*] Notice: This patent is subject to a terminal disclaimer.

[21] Appl. No.: 09/244,098

[22] Filed: Feb. 4, 1999

Related U.S. Application Data

[62] Division of application No. 08/540,887, Oct. 11, 1995, Pat. No. 5,900,615.

[30] Foreign Application Priority Data

Oct. 27, 1994 [JP] Japan .................. 6-263363

[51] Int. Cl.⁷ .................. G06K 7/10; C08C 21/00
[52] U.S. Cl. .................. 235/462.47; 235/462.06; 235/462.43; 235/472.01
[58] Field of Search .................. 235/462.06, 462.43, 235/462.47, 472.01

[56] References Cited

U.S. PATENT DOCUMENTS

| | | | |
|---|---|---|---|
| 4,805,175 | 2/1989 | Knowles | 374/24 |
| 5,015,831 | 5/1991 | Eastman et al. | 235/462 |
| 5,140,144 | 8/1992 | Shepard et al. | 235/472 |
| 5,144,120 | 9/1992 | Krichever et al. | 235/472 |
| 5,216,232 | 6/1993 | Knowles et al. | 235/467 |
| 5,262,627 | 11/1993 | Shepard | 235/472 |
| 5,280,164 | 1/1994 | Barkan | 235/467 |
| 5,281,801 | 1/1994 | Shepard et al. | 235/472 |
| 5,306,900 | 4/1994 | Metlitsky et al. | 235/472 |
| 5,334,826 | 8/1994 | Sato et al. | 235/455 |
| 5,343,029 | 8/1994 | Katoh et al. | 235/467 |
| 5,410,141 | 4/1995 | Koenck et al. | 235/472 |
| 5,468,949 | 11/1995 | Swartz et al. | 235/472 |
| 5,552,592 | 9/1996 | Dvorkis et al. | 235/462 |
| 5,578,810 | 11/1996 | Bard et al. | 235/472 |
| 5,581,067 | 12/1996 | Grosfeld et al. | 235/462 |
| 5,656,805 | 8/1997 | Plesko | 235/472 |
| 5,661,290 | 8/1997 | Bard et al. | 235/462 |
| 5,682,029 | 10/1997 | Dvorkis et al. | 235/472 |
| 6,000,619 | 12/1999 | Reddersen et al. | 235/462.45 |

FOREIGN PATENT DOCUMENTS 2-144785  6/1990  Japan ................ 235/455

*Primary Examiner*—Michael G Lee
*Assistant Examiner*—Douglas X. Rodriguez
*Attorney, Agent, or Firm*—Arent Fox Kintner Plotkin & Kahn PLLC

[57] ABSTRACT

A bar-code reader is easy to use and has an optical system that is easy to position and replace. The bar-code reader is used for a POS system. The bar code reader has a laser source for emitting a laser beam, a scan unit for scanning a bar code with the laser beam according to a predetermined scanning pattern, a window for emitting the laser beam from the scan unit, a condensing unit for condensing reflected light returned from the bar code through the window and scan unit along the route the laser beam traced, a photosensor for detecting the condensed light and providing an electric signal in proportion to the intensity of the detected light, and an emission-condensing unit incorporating the laser source, condensing unit, and photosensor, which can be easily and correctly mechanically installed.

2 Claims, 27 Drawing Sheets

REPLACEABLE EMISSION-CONDENSING UNIT FOR A BAR CODE READER

This application is a divisional application filed under 37 CFR § 1.53(b) of parent application Ser. No. 08/540,887, filed Oct. 11, 1995 now U.S. Pat. No. 5,900,615.

BACKGROUND OF THE INVENTION

1. Field of the Invention

The present invention relates to a bar-code reader for reading bar codes and optical marks and a POS system employing the bar-code reader.

2. Description of the Related Art

A POS terminal is connected to a bar-code reader to read a bar code on a piece of merchandise. The bar-code reader has an optical reader for reading a bar code and a recognition unit for recognizing the bar code. The optical reader emits a laser beam, according to a predetermined scanning pattern, to scan a bar code at a high speed, detects the light reflected from the bar code, and reads the bar code according to the reflected light.

The optical reader has a laser unit for emitting a laser beam, a rotating polygon mirror for reflecting the laser beam, a pattern mirror for reflecting the deflected laser beam according to a predetermined scanning pattern, a window for passing the reflected laser beam to the outside, and a photosensor for detecting the light reflected from a bar code.

The reflected light is guided by the pattern mirror and polygon mirror opposite to the emitted laser beam and is condensed by a condensing lens onto the photosensor. The photosensor provides an electric signal in proportion to the intensity of the condensed light. The output of the photosensor changes in response to the pattern of the bar code. The recognition unit processes the electric signal, to decode the bar code. The decoded data is supplied to the POS terminal connected to the bar-code reader.

According to the prior art, the laser unit, polygon mirror, pattern mirror, condensing lens, and photosensor are separately fixed to a casing of the bar-code reader.

To correctly scan a bar code, a laser beam of the laser unit must hit a predetermined position on the polygon mirror. To condense reflected light from the bar code onto the photosensor through the pattern mirror, polygon mirror, and condensing lens, the condensing lens must be correctly positioned with respect to the polygon mirror, the distance between the condensing lens and the photosensor must be accurately set, and the optical axis of the condensing lens must be aligned with the photosensor.

If these components are incorrectly positioned, the bar-code reader may produce a read error. These components, therefore, must be carefully installed in the bar-code reader by a skilled person.

A laser source in the laser unit has a certain service life, and therefore, the laser unit must be periodically replaced. This replacement must also be made carefully.

The laser source may be a semiconductor laser. The semiconductor lasers show different characteristics even under the same driving current. Namely, each semiconductor laser has its own light intensity and wavelength. The bar-code reader is designed to operate with a given characteristic of a laser source. Accordingly, the bar-code reader will have trouble if a replacement laser source has a different characteristic.

To solve this problem, the prior art adjusts a drive circuit for driving a replacement laser source so that the laser source may provide a required characteristic. This adjustment must be carried out whenever the laser source is replaced. This is laborious and takes a long time. In addition, it is difficult to precisely adjust the replaced laser source to the required characteristic.

The semiconductor lasers are vulnerable to static electricity. Accordingly, the laser source must be replaced without static electricity. To achieve this, time and labor are needed. Even with careful work, the laser source is sometimes damaged by static electricity.

If the photosensor is incorrectly positioned with respect to the condensing lens, the diameter of a condensed beam will increase. The wide beam is useless to read the thin bars of a bar code. This problem is serious when the bar-code reader is spaced away from the bar codes to be read.

The bar-code reader must be easy and convenient to use.

To recognize bargain merchandise, the operator of the bar-code reader attaches a memo listing the bargain merchandise to a space on a check-out counter. The memo on the check-out counter is usually far from the bar-code reader. Accordingly, the operator must alternately look at the memo and a bar code on merchandise. This is laborious for the operator.

It is important to minimize power consumption and extend the service life of the bar-code reader. For this purpose, the bar-code reader is set in a standby state while it is not reading bar codes. The bar-code reader must automatically be activated before reading bar codes.

To prevent shoplifting, each piece of merchandise is provided with a magnetic tag, which is nullified after the merchandise is paid at the check-out counter. If the merchandise is illegally brought out, a security apparatus at a shop entrance may detect the magnetism of the tag. The bar-code reader and a tag nullification unit are usually separate from each other at the check-out counter, to reduce the working space at the check-out counter.

The bar-code reader is connected to a POS terminal through a cable with or without a connector. The connector may come off the bar-code reader, and the cable may interfere with the operator.

After reading a bar code, the bar-code reader makes a sound to inform the operator of the completion of reading the bar code. To pass the sound, the casing of the bar-code reader has a speaker hole. The speaker hole may guide water into the bar-code reader, to damage the bar-code reader.

A keyboard of the POS terminal is usually placed on top of a tall bar-code reader. The operator must then extend his or her hands to the keyboard. This puts a strain on the operator.

SUMMARY OF THE INVENTION

A first object of the present invention is to provide a bar-code reader having an optical system that is easy to position and replace, thereby reducing adjustment work.

A second object of the present invention is to provide a bar-code reader capable of reading thin bars in a bar code irrespective of the position of the bar code.

A third object of the present invention is to provide a bar-code reader capable of showing an operator various pieces of information without forcing the operator to move his or her eyes far.

A fourth object of the present invention is to provide a bar-code reader that is put in a standby state when no bar codes are being read and is automatically and quickly put in a ready state to read bar codes.

A fifth object of the present invention is to provide a bar-code reader capable of nullifying tags, in a small space, with ease.

A sixth object of the present invention is to provide a bar-code reader having a cable that cannot come off or interfere with an operator.

A seventh object of the present invention is to provide a bar-code reader capable of generating a sound, of sufficient volume, to inform an operator of the completion of reading a bar code without the casing of the bar-code reader having a speaker hole.

An eighth object of the present invention is to provide a bar-code reader with a keyboard, placed thereon, which is easy to manipulate.

A ninth object of the present invention is to provide a POS system capable of showing an operator various pieces of information.

To accomplish the first object, a first aspect of the present invention provides a bar-code reader having a laser source for emitting a laser beam, a scan unit for scanning a bar code with the laser beam according to a predetermined scanning pattern, a window for passing the laser beam from the scan unit toward the bar code that is present or being moved in the vicinity of the window, a condensing unit for condensing reflected light returned from the bar code through the window and scan unit along the route the laser beam traced, and a photosensor for detecting the condensed light and providing an electric signal in proportion to the intensity of the detected light. The laser source, condensing unit, and photosensor are collectively incorporated in an emission-condensing unit that is mechanically precisely positioned.

The laser source and optical system are adjusted so that the emission-condensing unit may emit a laser beam at a predetermined position in a predetermined direction. The condensing unit and photosensor in the emission-condensing unit are adjusted to return the reflected light from the bar code opposite to the emitted laser beam. These components are easy to adjust. The emission-condensing unit as a whole is easy to replace.

The photosensor is arranged on an extension of the optical axis of a laser beam emitted from the emission-condensing unit, to realize easy adjustment and reduce installation errors.

The emission-condensing unit includes a circuit board, which supports the laser source, a drive circuit for driving the laser source, the photosensor, and a detection circuit for receiving and processing an electric signal from the photosensor. The intensity of the electric signal of the photosensor is determined by the intensity of detected light and the sensitivity of the detection circuit. In the emission-condensing unit, the relationship between the intensity of a laser beam emitted from the laser source and the sensitivity of the detection circuit is fixed in advance, to provide a stabilized electric signal without adjustment even if the emission-condensing unit is replaced.

The emission-condensing unit may have a light source unit that incorporates the laser source and a shaping lens for shaping a laser beam from the laser source.

The laser source may be a semiconductor laser, and the light source unit may incorporate the laser source and a temperature sensor for detecting the temperature of the semiconductor laser. This arrangement is capable of correctly estimating the service life of the laser source. According to the estimation, the laser source is replaced in a timely manner. The temperatures and ON periods of the laser source are recorded, to provide data about the service life of the laser source. The data is used to precisely analyze the service life of the laser source.

To accomplish the second object, a second aspect of the present invention provides a bar-code reader having a photosensor arranged closer to a condensing unit from a position where an object on the farthest edge of the readable range of the bar-code reader forms an image. Even if a bar code takes different positions, the diameter of a condensed beam on the photosensor will not be increased, and therefore, thin bars in the bar code will be readable.

To accomplish the third object, a third aspect of the present invention provides a bar-code reader having a memo holder adjacent to a window of a casing of the bar-code reader. The memo holder may be a metal plate to hold a memo with a magnet removably attached to the metal plate. The memo holder may be an insertion unit having an opening. A memo is inserted into the insertion unit and is seen through the opening. An operator can carry out a bar-code reading operation and read the memo without moving his or her eyes much.

To accomplish the fourth object, a fourth aspect of the present invention provides a bar-code reader having an environmental light detector for detecting a change in the intensity of the environmental light. The light detector is arranged on a casing of the bar-code reader on an extension of the center line of a window for passing a laser beam emitted from a scan unit. The environmental light detector is on the side of the window where an article having a bar code starts to move across the window. The bar code reader also has a controller for turning ON a laser source when the change in the detected intensity of environmental light is above a predetermined value. Since the environmental light detector is on the starting side of the window, any article crosses the environmental light detector before its bar code is read. Accordingly, the environmental light detector surely detects the presence of the article and instantaneously turns ON the laser source to surely read the bar code. When no bar code is being read, the laser source is turned OFF to reduce power consumption and elongate the service life.

To accomplish the fifth object of the present invention, a fifth aspect of the present invention provides a bar-code reader having a nullification unit for nullifying a tag for preventing shoplifting. The nullification unit is arranged beside a window on a route traced by an article having a bar code to be read. This arrangement reads the bar code of an article and then nullifies a tag attached to the article. The nullification unit is higher than the window of the bar-code reader, so that there is no need to lift an article when reading a bar code on the article. This improves operability. The nullification unit may be inclined to further improve the operability.

To accomplish the sixth object of the present invention, a sixth aspect of the present invention provides a bar-code reader having at least one cable that extends directly or through a connector from the back of a casing of the bar-code reader. The cable is covered with a cable cover that is removably attached to the back of the casing. The cable cover prevents the cable from coming off the casing. The cable cover may have a plurality of cable holes so that the cable is guided outside through one of the holes irrespective of the installation situation of the bar-code reader. The back of the casing may have a cable recess to accommodate the cable. The cable is fixed in the cable recess with fixing units.

To accomplish the seventh object of the present invention, a seventh aspect of the present invention provides a bar-code reader having a cover. The cover is attached to the bar-code reader, to entirely cover the bar-code reader. The cover has an opening for a window of the bar-code reader. The bar-code reader has a buzzer that faces the cover. A sound from the buzzer resonates in a space formed between the bar-code reader and the cover and goes outside. Due to the resonation, the sound is sufficiently large without buzzer holes. The buzzer may be selected from a plurality of buzzers having different wavelengths, so that the buzzer sound is distinguishable from others generated by adjacent bar-code readers.

To accomplish the eighth object of the present invention, an eighth aspect of the present invention provides a bar-code reader having a laser source for emitting a laser beam, a scan unit for scanning a bar code with the laser beam according to a predetermined scanning pattern, a window, a condensing unit for condensing reflected light returned from the bar code through the window and scan unit along the same path the emitted laser beam traced, and a photosensor for detecting the condensed laser beam and providing an electric signal in proportion to the intensity of the detected laser beam. The laser source, condensing unit, and scan unit are horizontally arranged to reduce the height of the bar-code reader.

To accomplish the ninth object of the present invention, a ninth aspect of the present invention provides a POS system having a bar-code reader and an information processing unit. The bar-code reader has a casing, a window, and a display unit arranged adjacent to the window. The information processing unit has a merchandise file for storing merchandise information and a retrieval unit for retrieving merchandise information from the merchandise file according to bar-code data provided by the bar-code reader. The retrieved information is transferred to the bar-code reader. The bar-code reader displays the information on the display unit. This arrangement is capable of displaying information about a bar code just read. The displayed information is easy for an operator to see.

BRIEF DESCRIPTION OF THE DRAWINGS

The present invention will be more clearly understood from the description as set forth below with reference to the accompanying drawings, in which.

DESCRIPTION OF THE PREFERRED EMBODIMENTS

Before proceeding to a detailed description of the preferred embodiments of the present invention, a conventional bar-code reader will be described below for a clearer understanding of the differences between the present invention and the prior art.

Figure 1:
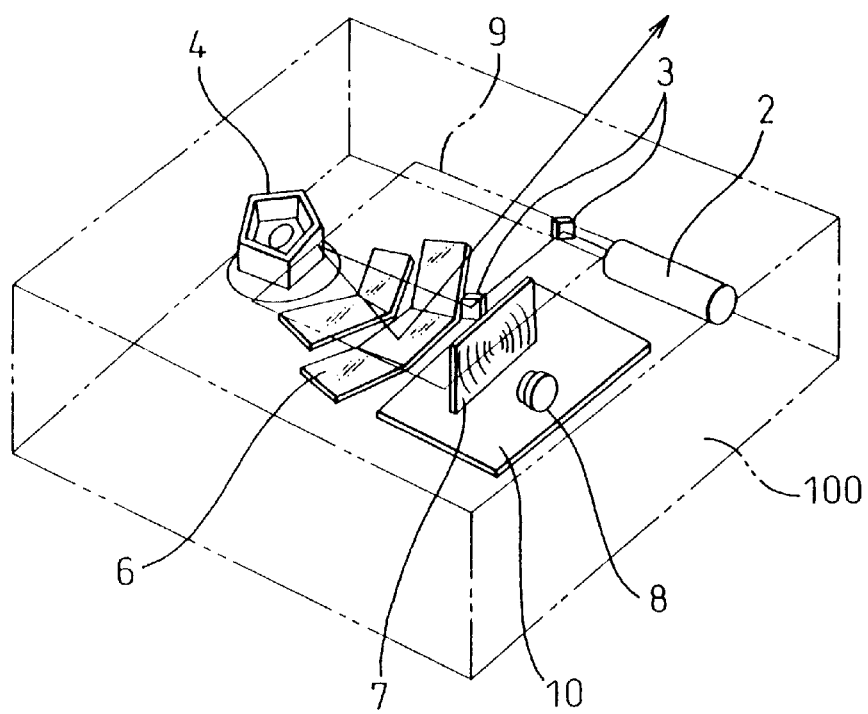
FIG. 1 is a perspective view showing a bar-code reader according to a prior art.

FIG. 1 shows the conventional bar-code reader. The bar-code reader has a laser unit 2 such as a laser tube for emitting a laser beam. A reflector 3 reflects the laser beam toward a polygon mirror 4. The polygon mirror 4 is rotated at a high speed by a motor 5. The side faces of the polygon mirror 4 have mirrors to reflect the laser beam from the reflector 3 and provide a scan beam. A pattern mirror 6 reflects the scan beam upwardly. This beam is passed through a window 9, to scan a bar code. Reflected light from the bar code enters the bar-code reader through the window 9.

Figure 2:
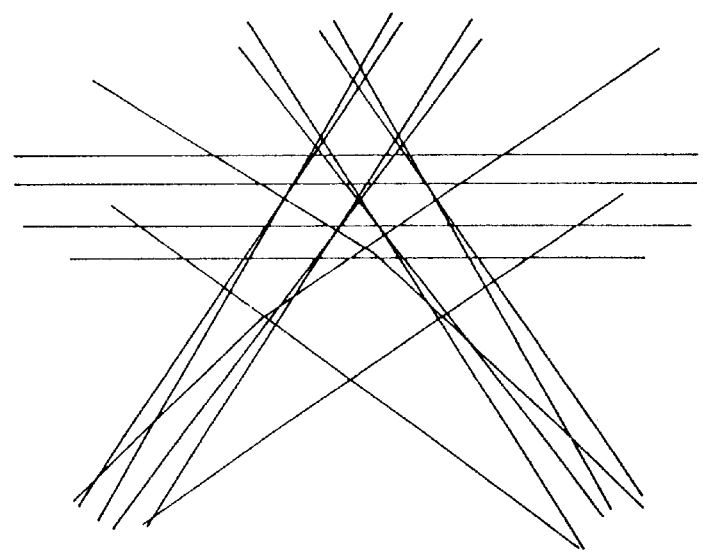
FIG. 2 shows laser beam scanning patterns.

FIG. 2 shows an example of a scanning pattern of a laser beam at a position for scanning a bar code. The polygon mirror 4 and pattern mirror 6 are adjusted to provide such a scanning pattern.

The reflected light from the bar code is reflected by the pattern mirror 6 and polygon mirror 4 and is condensed by a condensing lens 7. The condensed light is made incident to a photosensor 8. The photosensor 8 and a controller (not shown) are mounted on a printed board 10. In proportion to the intensity of the light, the photosensor 8 generates an electric signal. According to the electric signal, the controller decodes the bar code and transfers the decoded data to an external POS terminal.

The photosensor 8 is adjusted to a position where the condensing lens 7 focuses reflected light.

Figure 3:
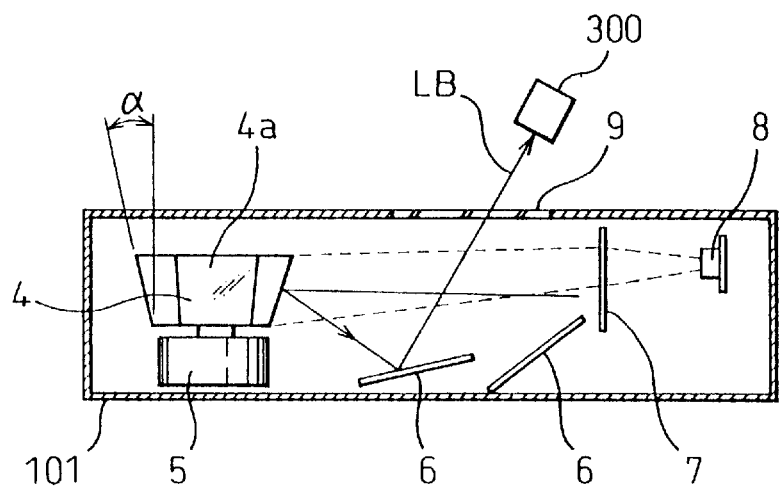
FIG. 3 is a sectional view showing a unitized bar-code reader according to a prior art.

FIG. 3 is a sectional view showing the bar-code reader of the prior art.

The laser unit 2, reflector 3, condensing lens 7, and photosensor 8 are separately incorporated in a casing 101 of the bar-code reader.

To scan a bar code with a laser beam emitted from the laser unit 2 and reflected by the polygon mirror 4, the laser unit 2 and reflector 3 must be correctly positioned with respect to each other, so that the laser beam is made incident to a predetermined position on the polygon mirror 4. To receive reflected light from the bar code by the pattern mirror 6 and polygon mirror 4 and focus the reflected light on the photosensor 8 through the condensing lens 7, the position of the polygon mirror 4 with respect to the condensing lens 7, the distance between the condensing lens 7 and the photosensor 8, and the position of the optical axis of the condensing lens 7 with respect to the photosensor 8 must be correctly set. In addition, the route of the laser beam must be adjusted. The condensing lens 7 may be a condensing mirror.

If these components are incorrectly positioned, a read error will occur. Accordingly, these components must be carefully positioned by a skilled worker.

Figure 4:
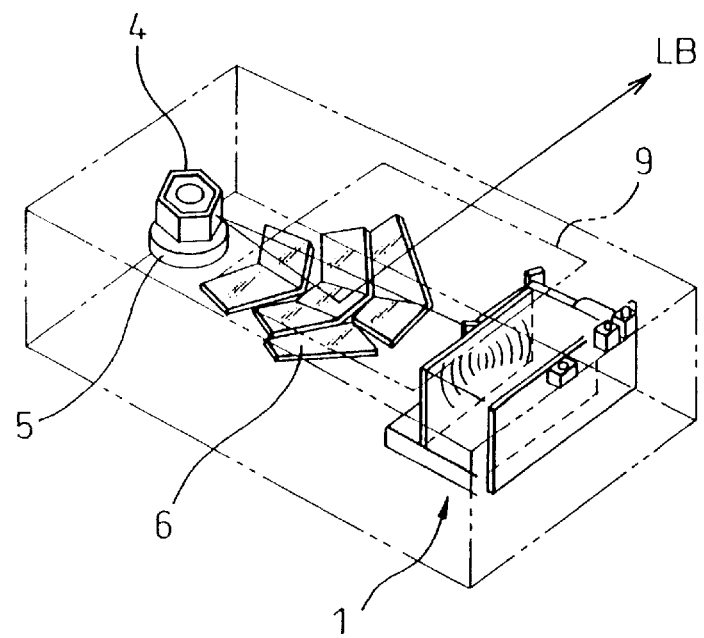
FIG. 4 is a perspective view showing a bar-code reader according to a first embodiment of the present invention.

FIG. 4 is a perspective view showing a bar-code reader according to the first embodiment of the present invention. An emission-condensing unit 1 includes a laser unit 2, reflectors 31 and 32, a condensing lens 7, and a photosensor 8. The other parts of this embodiment are the same as those of the prior art of FIG. 1.

Figure 5:
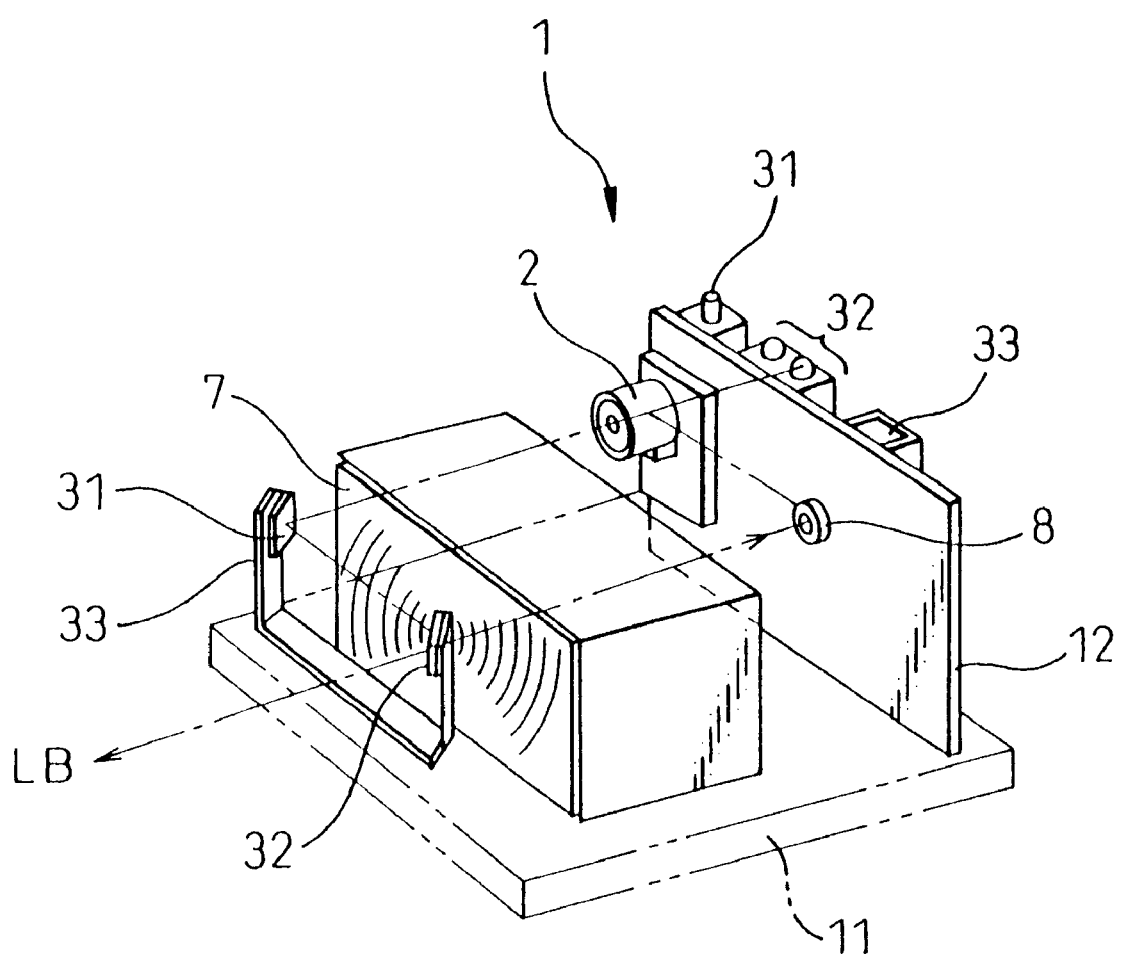
FIG. 5 shows an emission-condensing unit of the first embodiment.

FIG. 5 shows the details of the emission-condensing unit 1. The unit 1 is a combination of a part for emitting a laser beam and a part for condensing and detecting reflected light from a bar code.

A printed board 12 supports the laser unit 2 and photosensor 8, and a base 11 supports the condensing lens 7, reflectors 31 and 32, and printed board 12.

Figure 6A:
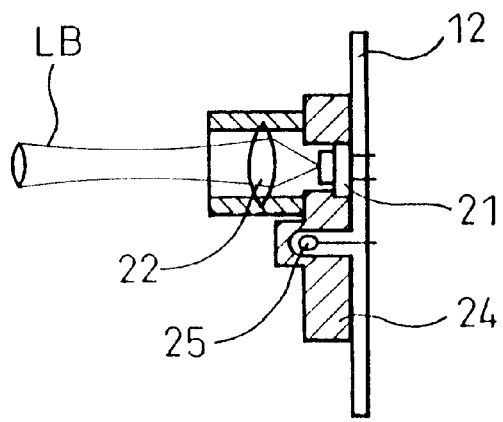
FIGS. 6A and 6B show a light source unit of the first embodiment.

FIG. 6A is a sectional view showing the laser unit 2. The laser unit 2 has a laser source 21 such as a semiconductor laser for emitting a laser beam, a shaping lens 22 for shaping and focusing the laser beam, a heat sink 24 for radiating heat generated by the laser source 21, and a temperature sensor 25 for detecting the temperature of the laser source 21. To focus the laser beam from the laser source 21 on a predetermined position, the distance between the laser source 21 and the shaping lens 22 must be set to a predetermined value. Since these components are fixed in the laser unit 2, there is no need to adjust the distance between the laser source 21 and the shaping lens 22 when the unit 2 is replaced.

Figure 6B:
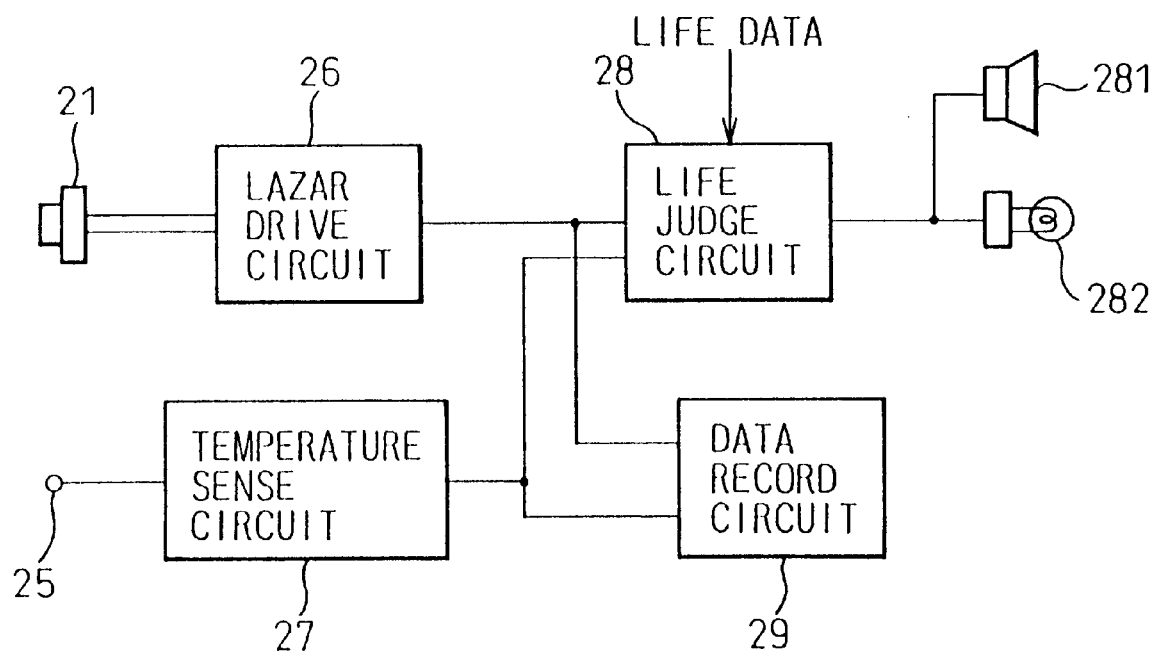

FIG. 6B shows a circuit for determining an ON time of the laser source 21 and processing the temperature provided by the temperature sensor 25.

A drive circuit 26 of the laser source 21 provides ON information about the laser source 21. A temperature detection circuit 27 processes the output of the temperature sensor 25 and provides a detected temperature. A life judgement circuit 28 determines whether or not the laser source 21 has reached a set life according to the ON information from the drive circuit 26, the temperature from the temperature detection circuit 27, and reference life data. If the life judgement circuit 28 determines that the laser source 21 has reached the end of its life, a buzzer 281 and a lamp 282 generate an alarm to let an operator replace the emission-condensing unit 1. A data record circuit 29 records the ON information and temperature information. The information stored in the data record circuit 29 is used to analyze the life of the replaced laser source. A result of the analysis is used to more precisely predict the life of a laser source.

The prior art determines the life of a semiconductor laser according to only the ON time of the semiconductor laser. In practice, however, the life of a semiconductor laser is also influenced by the temperature thereof. Accordingly, the present invention employs the ON time as well as the temperature of a semiconductor laser, to correctly determine the life thereof.

The laser source 21 and the drive circuit 26 are integrated together on the printed board 12. Accordingly, it is not necessary to adjust the drive circuit 26 when the laser unit 2 is replaced. The drive circuit 26 is covered with a metal shield to prevent damage from static electricity.

The photosensor 8 detects light reflected by a bar code and condensed by the condensing lens 7. The photosensor 8 is fixed to a predetermined position on the printed board 12 and is connected to a detection circuit (not shown) mounted on the printed board 12.

A switch 31 is used to turn ON/OFF a power source of the bar-code reader.

An indicator 32 has, for example, two LEDs. The indicator 32 is used to inform an operator whether or not a bar code has been correctly read. If a read error occurs, the operator of the bar-code reader must repeat the read operation of the bar code. One of the LEDs is turned ON when a bar code is correctly read, and the other is turned ON when a read error occurs. The printed board 12 includes a control circuit for controlling the ON/OFF operation of the LEDs according to a result of reading a bar code. The number of the LEDs is not limited to two. It may be one, three, or more.

An environmental light sensor 33 detects the intensity of light around the bar-code reader and serves as a restart sensor.

To read a bar code, the laser source 21 must be turned ON, and the motor 5 must be driven to turn the polygon mirror 4. Always activating the laser source 21 and motor 5 wastes power. It is required to minimize power consumption while no bar code is being read.

The service life of the semiconductor laser is relatively short. The semiconductor laser will shortly be exhausted if it is continuously activated. To extend the service life of the laser source, it is necessary to turn OFF the same when no bar code is being read.

To read a bar code, the operator puts an article or his or her hands on the bar-code reader. This results in decreasing the intensity of environmental light. Detecting such a decrease may determine the start of a bar-code reading operation. The environmental light sensor 33 is used to detect this kind of change in the intensity of environmental light.

The environmental light sensor 33 is connected to a detection circuit mounted on the printed board 12. The detection circuit compares the intensity of the environmental light detected by the sensor 33 with a threshold. If the detected intensity is below the threshold, a bar code reading operation must be started, and therefore, the motor 5 is driven. In this way, the sensor 33 is capable of reducing power consumption while no bar code is being read and extending the service life of the laser source 21.

The condensing lens 7 focuses reflected light from a bar code on the photosensor 8. The reflectors 31 and 32 reflect a laser beam emitted by the laser unit 2 toward the polygon mirror 4. The base 11 is made of resin.

Figure 7A:
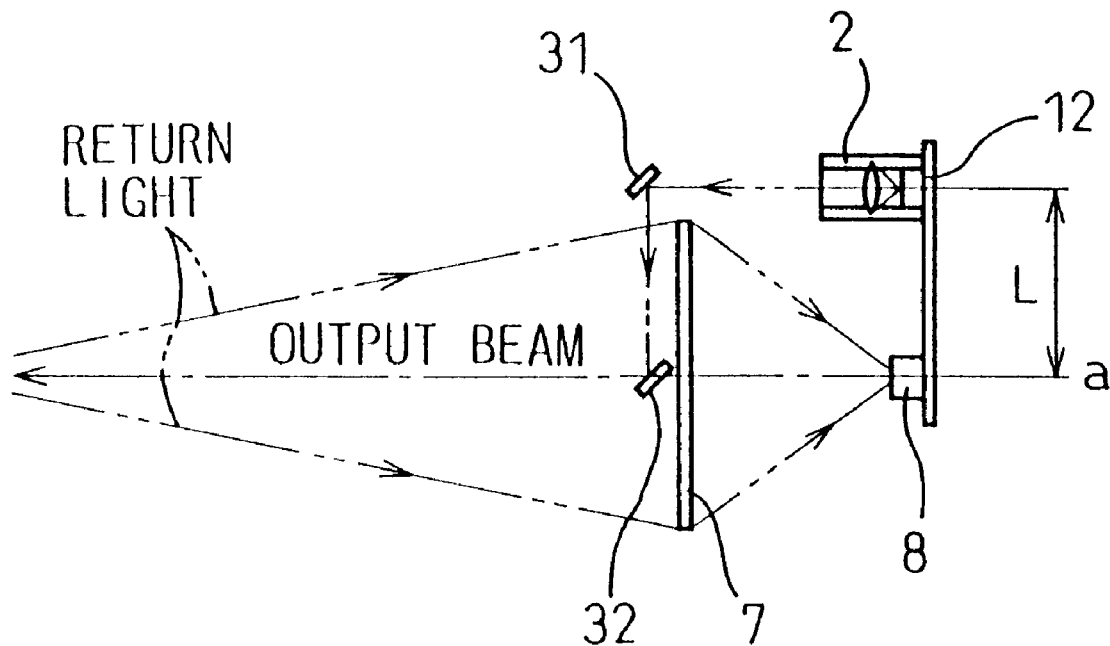
FIGS. 7A and 7B shows the paths of an emitted beam and reflected light in the emission-condensing unit.
Figure 7B:
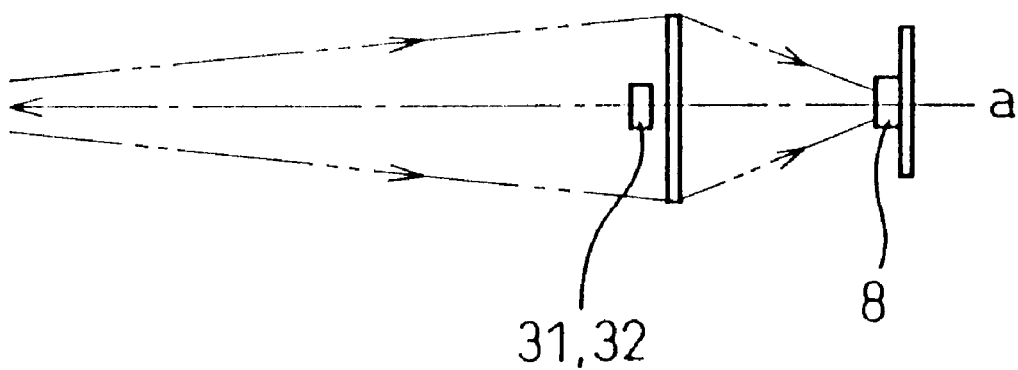

FIGS. 7A and 7B show a laser beam emitted by the laser unit 2, reflected light from a bar code, and the positions of the components incorporated in the emission-condensing unit 1. FIG. 7A is a top view, and FIG. 7B is a side view.

The optical axis of an output beam from the laser unit 2 is aligned with the optical axis of the reflected light. The output beam from the laser unit 2 is reflected by the reflector 31 by 90 degrees. The laser beam from the reflector 31 is reflected by the reflector 32 by about 90 degrees in an opposite direction. As a result, the laser beam is directed toward the polygon mirror 4 along the optical axis a.

Reflected light from a bar code has a certain width and is made incident to the condensing lens 7. The optical axis of the condensing lens 7 is aligned with the optical axis a. The condensing lens 7 focuses the reflected light on the photosensor 8. The center of the photosensor 8 is on the optical axis a and is positioned at the focal point of the condensing lens 7, so that the reflected light condensed by the condensing lens 7 focuses on the photosensor 8.

There is no mirror between the condensing lens 7 and the photosensor 8, so that the light from the condensing lens 7 directly enters the photosensor 8. The laser unit 2 is on the printed board 12 and is away from the photosensor 8 by a distance L so that the laser unit 2 does not interfere with the condensed light, and the laser beam from the laser unit 2 does not interfere with the condensing lens 7. The laser unit 2 and photosensor 8 are at the same level.

To satisfy the positional relationships of FIGS. 7A and 7B among the components, the laser unit 2 and photosensor 8 are fixed at predetermined positions on the printed board 12, and the condensing lens 7 is arranged on the base 11 so that the optical axis of the condensing lens 7 agrees with the optical axis a.

The reflectors 31 and 32 are attached to each end of an arm 33 made of a bent metal plate. The height of the ends of the arm 33 is determined according to the heights of the laser unit 2 and polygon mirror 4. The distance between the ends of the arm 33 is equal to the distance L of FIG. 7A.

The lengths of the base of the lens unit 2 and the arm 33 are determined to maintain the distance between the condensing lens 7 and the photosensor 8. The base 11 and printed board 12 are fixed to each other with, for example, screws.

With these arrangements, the positions of the components of the emission-condensing unit 1 require no adjustment when the unit 1 is replaced, thereby improving workability.

Figure 8A:
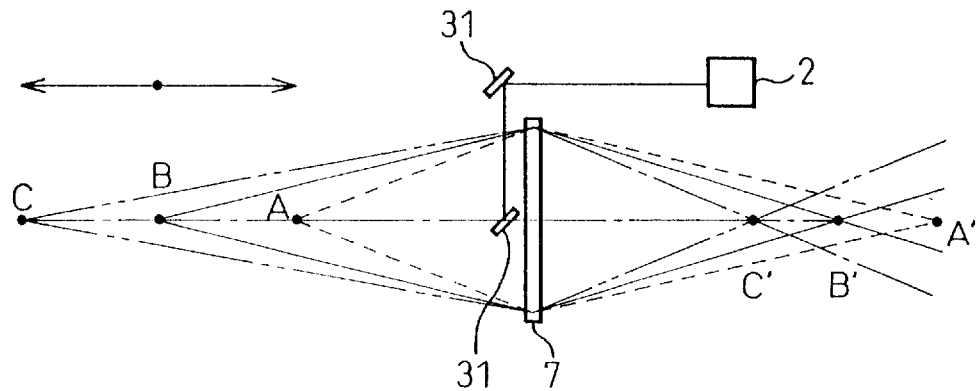
FIG. 8A show different image forming positions of reflected light with respect to different bar-code positions according to the present invention.
Figure 8B:
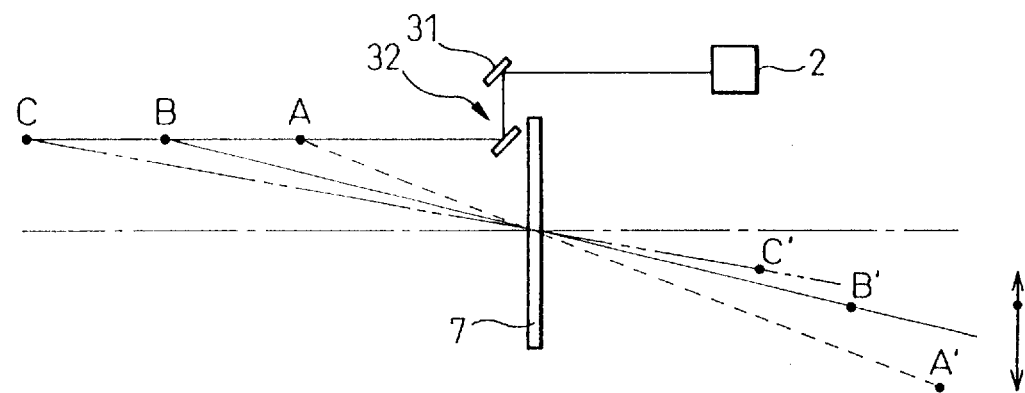
FIGS. 8B and 8C show different image forming positions of reflected light with respect to different bar-code positions according to the prior art.
Figure 8C:
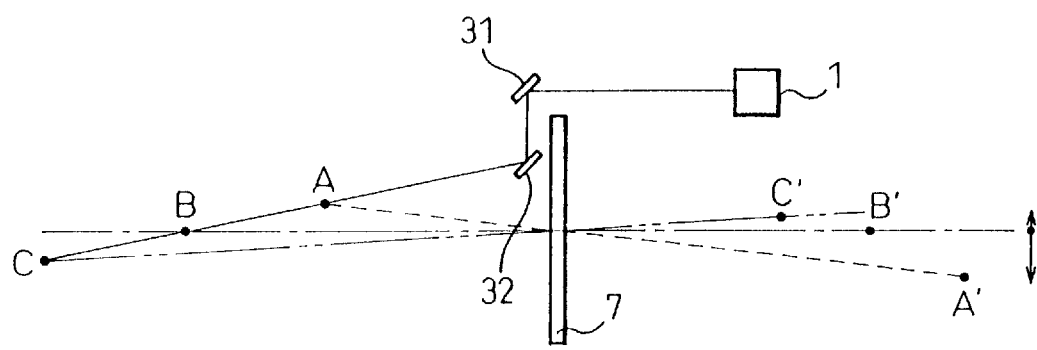

The effect of aligning a laser beam from the emission-condensing unit 1 with the optical axis of the condensing lens 7 will be explained with reference to FIGS. 8A to 8C in which FIG. 8A shows optical paths of the present invention and FIGS. 8B and 8C show optical paths of the prior art.

Each bar-code reader has a readable range. The bar-code reader must be able to read any bar code that is in the readable range. The nearest point of the readable range to the window of the bar-code reader is A, the farthest point thereof is C, and the intermediate point thereof is B.

A laser beam from the emission-condensing unit 1 is reflected by the polygon mirror 4 and pattern mirror 6, to scan a bar code. Irrespective of the rotational position of the polygon mirror 4, a scan point on the bar code is on an extension of the laser beam emitted from the unit 1. Accordingly, the points A, B, and C will be on an extension of the output laser beam. The laser beam is reflected and scattered by the bar code. Part of the reflected light is reflected by the pattern mirror 6 and polygon mirror 4 and is condensed by the condensing lens 7 onto the photosensor 8, which converts the light into an electric signal. Namely, the condensing lens 7 forms an image of a light spot on the bar code at a position close to the photosensor 8. In FIG. 8A, the output beam from the unit 1 agrees with the optical axis of the condensing lens 7. Accordingly, any one of the points A, B, and C is on the optical axis of the condensing lens 7. Therefore, the image of any one of the points A, B, and C is formed on the optical axis of the condensing lens 7. The photosensor 8 arranged on the optical axis of the condensing lens 7 efficiently catches the condensed light.

According to the prior art of FIG. 8B, an output beam from the emission-condensing unit 1 is in parallel with and away from the optical axis of the condensing lens 7. According to the prior art of FIG. 8C, an output beam from the unit 1 intersects the optical axis of the condensing lens 7 at the intermediate point B. A main beam from any one of the points A, B, and C passing through the center of the condensing lens 7 has an inclination with respect to the optical axis of the condensing lens 7 in FIGS. 8B and 8C. Accordingly, the image of any one of the points A to C of the prior art vertically varies, and therefore, the photosensor 8 is unable to correctly read the image.

The position of the optical axis of the photosensor 8 will be explained.

FIGS. 9 to 12 show the relationship between the position of a piece of merchandise and the focal point of the condensing lens 7.

As shown in FIG. 8A, the nearest point A of the readable range forms an image at a farthest point A' from the condensing lens 7. The intermediate point B forms an image at an intermediate point B'. The farthest point C forms an image at a nearest point C' to the condensing lens 7.

Figure 9:
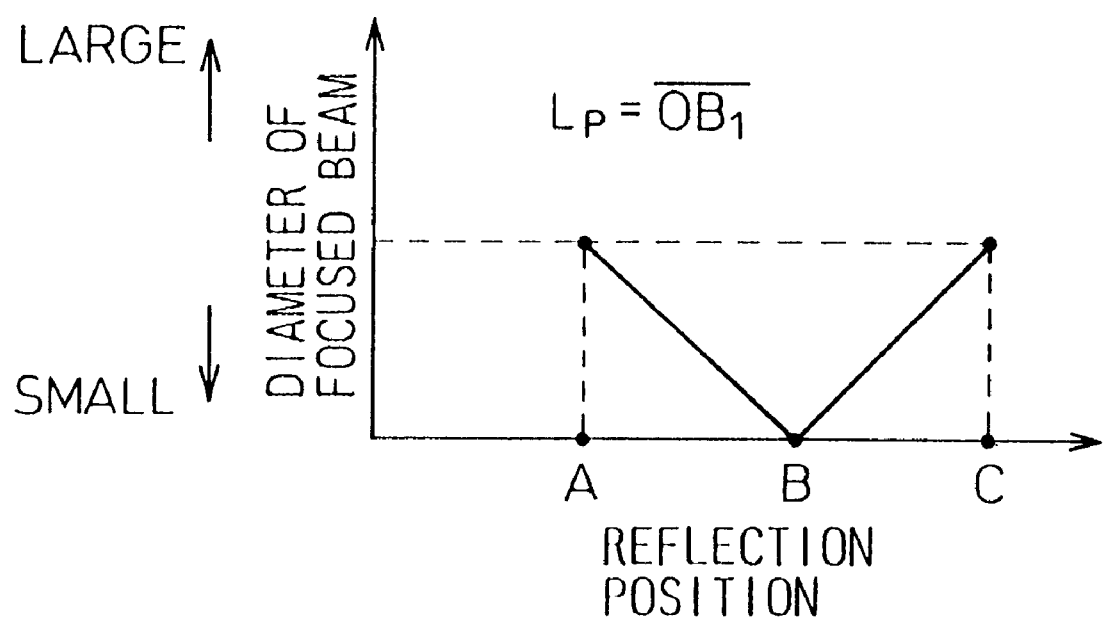
FIG. 9 shows a change in the diameter of a condensed beam in response to a change in the position of a bar code.

The prior art arranges the photosensor 8 at the intermediate point B'. In this case, the relationship between a reflection point and the diameter of a condensed beam on the photosensor 8 is as shown in FIG. 9. Namely, the diameter of a condensed beam from the point B is smallest on the photosensor 8 positioned at the point B'. As the reflection point separates from the point B, the diameter of the condensed beam enlarges.

The larger the diameter of the condensed beam is, the smaller the detectable minimum width of a bar decreases. Accordingly, when a bar code is positioned at the point A or C, it is difficult to detect thin bars in the bar code. When the bar code is at the point C farthest from the bar-code reader, it is possible to detect only wide bars in the bar code.

Figure 10:
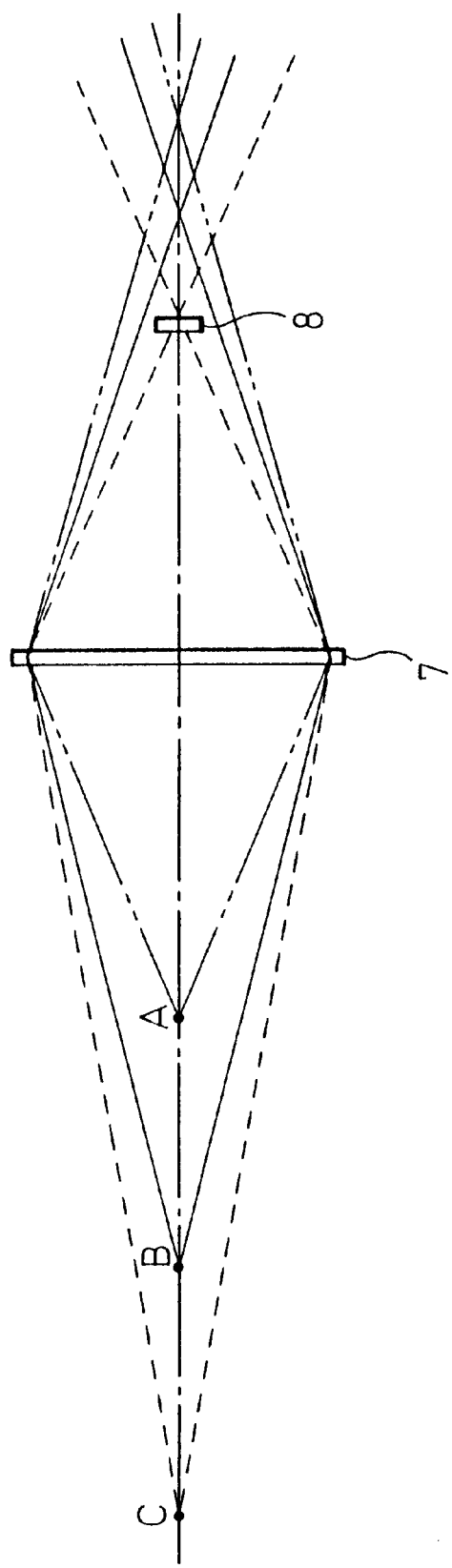
FIG. 10 shows the relationship between a condensed beam and a photosensor when the photosensor is positioned at a distal end of a bar-code readable range.

FIG. 10 shows the position of the photosensor 8 according to the present invention.

Figure 11:
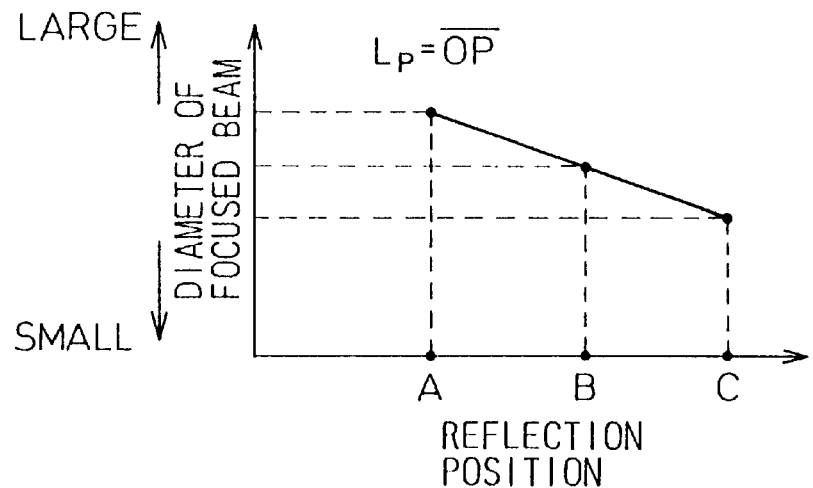
FIG. 11 shows changes in the diameter of a condensed beam based on the relationship of FIG. 10.
Figure 12:
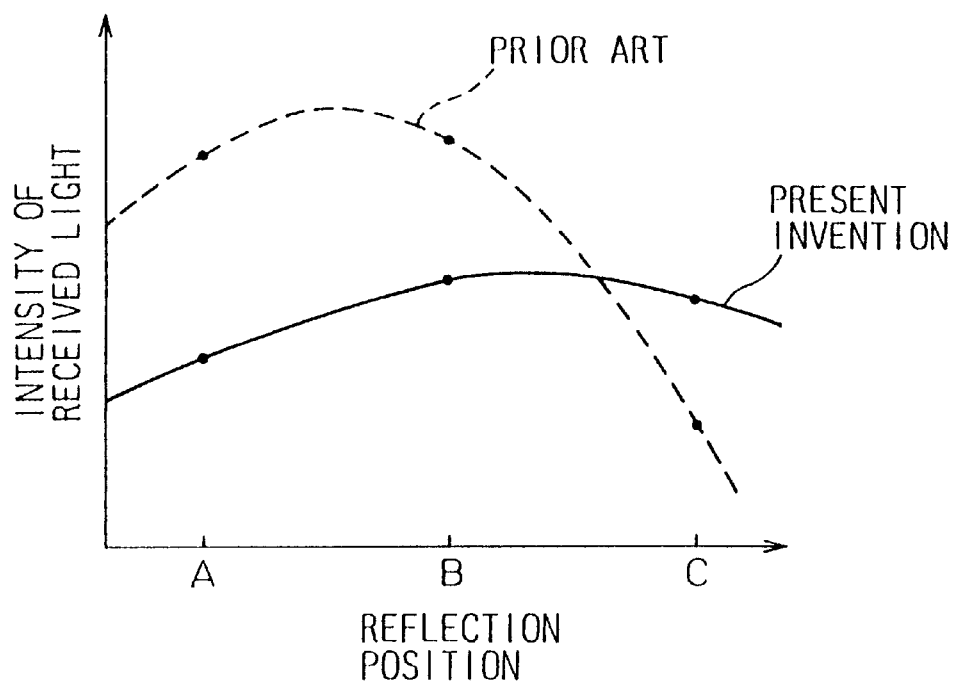
FIG. 12 shows a change in the intensity of light detected by the photosensor according to a change in a bar-code read position.

The photosensor 8 is closer to the condensing lens 7 than the focal distance f of the lens 7. FIG. 11 shows the relationship between a reflection point and the diameter of a condensed beam in this arrangement. The diameter of a condensed beam on the photosensor 8 is largest when reflected light comes from the point A nearest to the bar-code reader. The diameter of the condensed light becomes smaller as the reflection point separates from the bar-code reader, and is smallest at the farthest point C of the readable range.

Since the diameter of the condensed beam becomes smaller as the distance between the bar code and the bar-code reader elongates, narrow bars of the bar code can be read even if the article is away from the bar-code reader. When the bar code is close to the bar-code reader, the diameter of the condensed beam is large. However, even in this case, bars having a minimum width are readable.

In this way, the present invention arranges the photosensor 8 at a position where reflected light from the farthest point of the readable range forms an image through the condensing lens 7. It is possible to arrange the photosensor 8 closer to the condensing lens 7 from this position. For example, the photosensor 8 may be arranged closer to the condensing lens 7 from the focal point of the lens 7. This arrangement enables the photosensor 8 to correctly read bar codes positioned at the distal or proximal end of the readable range.

The intensity of the reflected light caught by the photosensor 8 is determined by the solid angle at which the condensing lens 7 is visible from a laser beam emission point and the ratio of part of the reflected light that enters the photosensor 8 to the total reflected light. The solid angle decreases in order of the positions A, B, and C of FIG. 10. The prior art arranges the condensing lens 7 at a position where reflected light from the position B is focused. Accordingly, the ratio of part of reflected light that enters the photosensor 8 to the total reflected light is maximum at the position B, and those at the positions A and C are lower than that. Consequently, the intensity of reflected light detected by the photosensor 8 according to the prior art changes as indicated with a dotted line in FIG. 12. On the other hand, the present invention arranges the photosensor 8 at a position where reflected light from the position C is condensed by the condensing lens 7. Accordingly, the ratio of part of reflected light that enters the photosensor 8 to the total reflected light is maximum at the position C. As a result, the intensity of reflected light received by the photosensor 8 according to the present invention is as indicated by a continuous line in FIG. 12.

When the intensity of the reflected light received by the photosensor 8 is weak, an electric signal generated by the photosensor 8 is incorrectly processed. The bar-code reader must read any bar code in the readable range. To realize this, the prior art determines a detectable lower limit of the photosensor 8 according to the weakest intensity of reflected light coming from the position C. Namely, the photosensor 8 must be more sensitive. On the other hand, the intensity of light received by the photosensor 8 of the present invention is averaged with respect to the positions A, B, and C. The intensity of light coming from any one of these positions and received by the photosensor 8 is larger than the intensity of light coming from the position C and received by the prior art. Namely, the sensitivity of the photosensor 8 of the present invention may not be so high. One technique of improving the sensitivity of the photosensor 8 is to increase the light receiving area. This results in increasing the cost of the bar-code reader and decreasing the response speed. Another technique is to increase the amplification ratio of an electric circuit of the photosensor. This results in increasing noise and read errors.

The operator of the bar-code reader must recognize time-limited discount merchandise and usual discount merchandise. Accordingly, the operator usually attaches a memo listing the discount merchandise to a space on a check-out counter or on a keyboard.

The height of the check-out counter differs from the height of the window of the bar-code reader, and the check-out counter is usually spaced from the bar-code reader. To read a bar code, the operator looks at the window of the bar-code reader. To check the memo, the operator looks at the check-out counter. In this way, the operator must move his or her eyes between the bar-code reader and the check-out counter. This is laborious for the operator.

The memo is simply attached to the check-out counter with an adhesive tape, and therefore, easily comes off.

To solve these problems, a bar-code reader according to the second embodiment of the present invention has a device for keeping a memo near a window of the bar-code reader so that the operator may easily see the memo.

Figure 13:
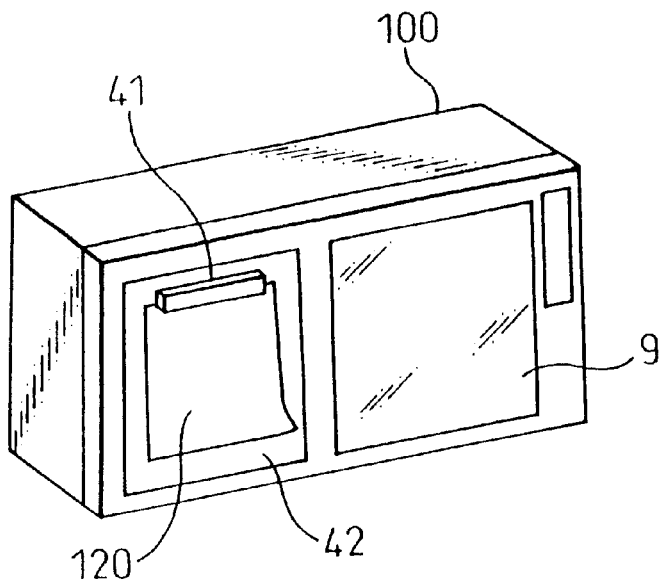
FIG. 13 shows a bar-code reader according to a second embodiment of the present invention, having a metal plate beside a window to hold a memo with a magnet.

FIG. 13 is an external view showing the bar-code reader according to the second embodiment. The bar-code reader has a metal plate 42 beside a window 9. A magnet 41 is used to fix a memo 120 on the metal plate 42. A clip to hold a memo may be attached to the metal plate 42.

In FIG. 13, the window 9 is on the right side, to provide a relatively larger space on the left side for the memo.

Figure 14:
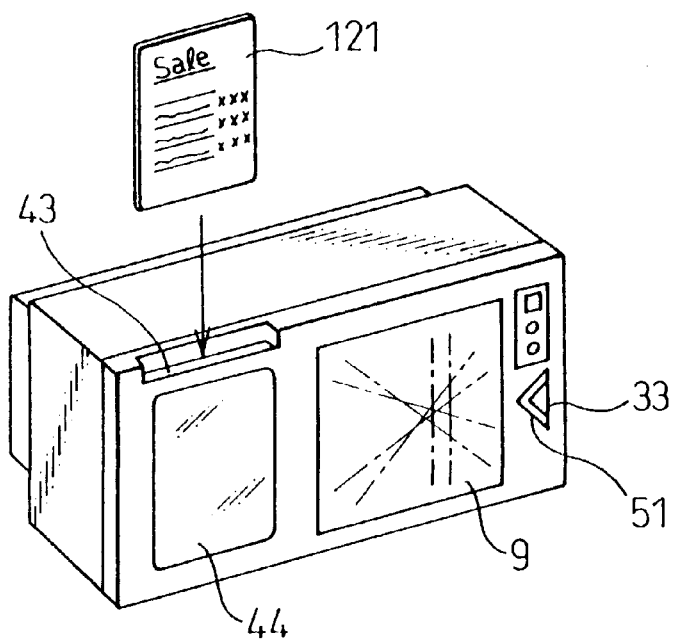
FIG. 14 shows a bar-code reader according to a third embodiment of the present invention, having a memo insertion unit beside a window.

FIG. 14 is an external view showing a bar-code reader according to the third embodiment of the present invention. The bar-code reader has an opening 43 beside a window 9. A memo 121 is inserted into the opening 43. The memo 121 is seen through a window 44, which is covered with transparent glass or resin to prevent water from soaking the memo 121 or damaging the inside of the bar-code reader. If the bar-code reader is waterproof, or if there is no risk of soaking the memo, or if the memo is waterproof, the window 44 need not have a glass or resin cover.

Figure 15:
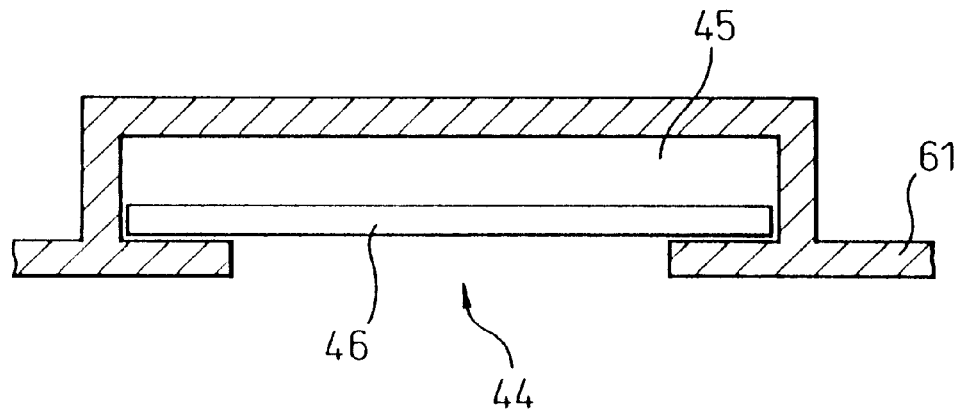
FIG. 15 is a sectional view showing the memo insertion unit of the third embodiment.

FIG. 15 is a sectional view showing a cover 61 of the bar-code reader. The cover 61 has a channel shape. A space 45 is formed between the glass 46 and the cover 61. The memo 121 is inserted into the space 45. The top of the cover 61 is provided with the opening 43 for passing the memo 121 as shown in FIG. 14. The opening 43 is shaped to easily pass the memo 121. The opening 43 may have a lid to hold the memo 121 when the bar-code reader is vertically installed.

In FIG. 14, the cover 61 of the bar-code reader is provided with a pass mark 51 of any shape (a triangle in FIG. 14). The pass mark 51 serves as a guide to pass a bar code in front of the bar-code reader. The pass mark 51 indicates an optimum position for passing a bar code to be read.

Since articles having bar codes are almost always passed over the pass mark 51, the bar-code reader of the third embodiment has an environmental light sensor (restart sensor) 33 at the pass mark 51. When blocked by articles or hands, the sensor 33 senses a change in the intensity of environmental light. The motion of passing articles differ from person to person, and therefore, the position of the sensor 33 must be carefully selected.

As mentioned above, articles are almost always passed over the mark 51 even if there are individual differences. The environmental light sensor 33 installed near the mark 51, therefore, surely detects a change in the environmental light, to turn ON/OFF the laser source and the motor of the polygon mirror.

The installation position of the environmental light sensor 33 is not limited to near the mark 51. The sensor 33 may be arranged anywhere on the path for passing articles having bar codes, or a position which is naturally seen by an operator. It is preferable to arrange the sensor 33 on the side of the window of the bar-code reader to where an article starts to move across the window.

Since the operator sees the mark 51 whenever he or she passes an article having a bar code over the mark 51, a lamp or a display to show whether or not the bar code has correctly been read may be installed around the mark 51. This arrangement is convenient because the operator may confirm whether or not a bar code has successfully been read without moving his or her eyes much.

Figure 16:
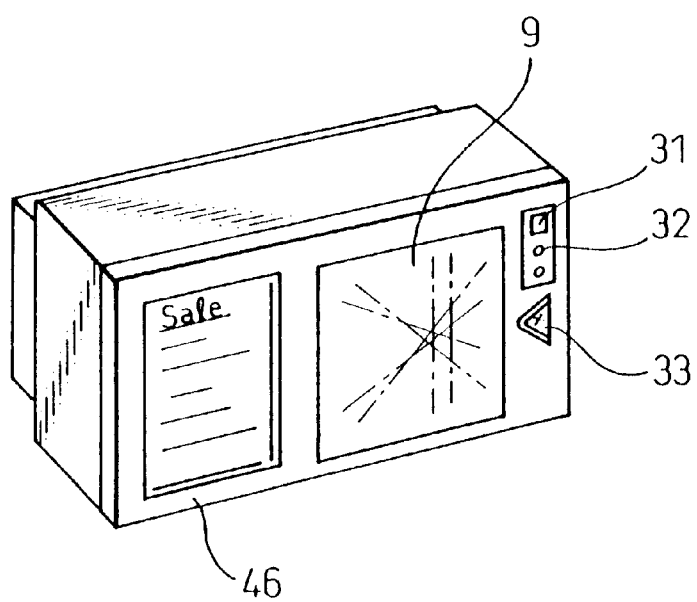
FIG. 16 shows a bar-code reader according to a fourth embodiment of the present invention, having a display unit for displaying information sent from a POS system and a restart sensor for turning ON a laser source.

FIG. 16 shows a bar-code reader according to the fourth embodiment of the present invention. This bar-code reader is provided with a display unit 46 such as a liquid crystal panel on the front surface of the bar-code reader.

Figure 17A:
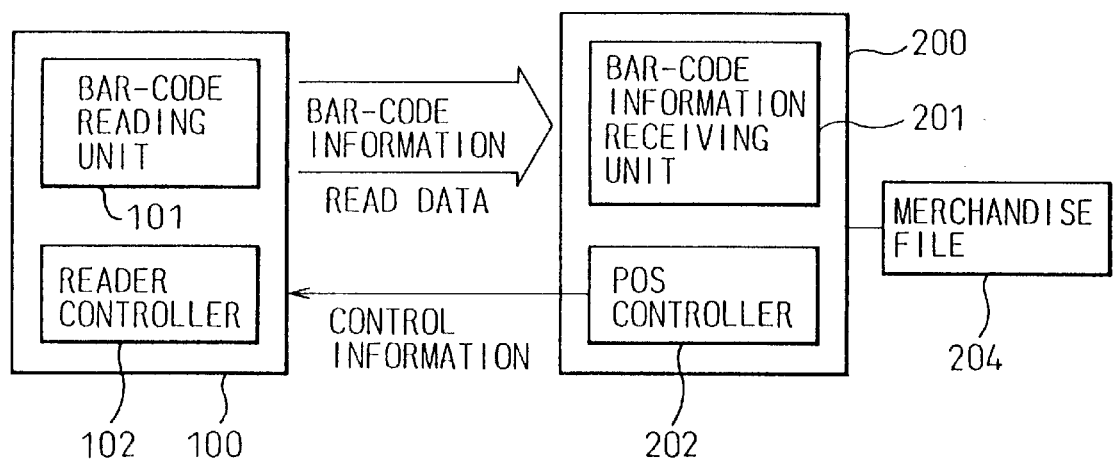
FIGS. 17A and 17B are flowcharts showing a flow of data in the bar-code reader and POS terminal according to the fourth embodiment.
Figure 17B:
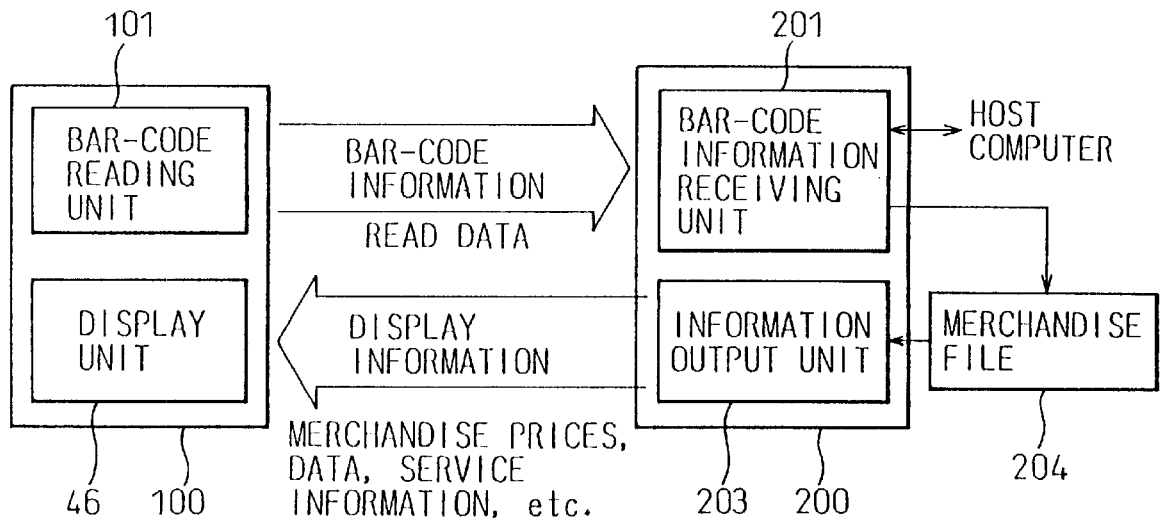

FIGS. 17A and 17B show a bar-code reader 100 connected to a POS terminal 200, and a flow of data between them. The bar-code reader 100 has a bar-code reading unit 101, which transmits bar-code data to the POS terminal 200 through a cable. The bar-code data is received by a receiving unit 201 of the POS terminal 200. According to the bar-code data, the POS terminal 200 retrieves a commodity name, price, etc., from a merchandise file 204.

FIG. 17A shows a flow of data according to the prior art. The POS terminal 200 sends to the bar-code reader 100 only an alarm signal indicating that no information has been retrieved from the merchandise file 204. On the other hand, the POS terminal 200 of the present invention sends, for example, information about bargain merchandise to the bar-code reader 100, which displays the information on the display unit 46.

The merchandise file 204 stores various pieces of merchandise information such as the names, codes, discount prices, etc., of articles to be discounted for a predetermined period of time. These pieces of information are displayed on the display unit 46 of the bar-code reader of the present invention.

FIG. 17B shows a flow of data according to the present invention. The POS terminal 200 sends to the bar-code reader 100 information about merchandise prices and services to be displayed on the display unit 46. An information output unit 203 prepares information to be displayed according to the contents of the merchandise file 204 and instructions from a higher apparatus.

When the time to start a bargain sale comes, the POS terminal 200 retrieves the names and prices of articles to be discounted from the merchandise file 204 and sends the data to the bar-code reader 100. The bar-code reader 100 displays the data on the display unit 46. As a result, the operator may confirm the details of the bargain articles on the display unit 46.

The merchandise file 204 also stores usual bargain articles. When the shop is opened, the POS terminal 200 retrieves information about the bargain articles from the merchandise file 204 and transfers the information to the bar-code reader 100. The bar-code reader 100 displays the information on the display unit 46.

After the bar-code reader 100 reads a bar code, the POS terminal 200 displays the commodity name, price, etc., related to the bar code. When reading a bar code, the operator must see the bar-code reader 100, and when confirming the commodity name and price related to the bar code, the operator must see the display of the POS terminal 200. If the POS terminal is away from the bar-code reader due to the layout of the check-out counter, the operator must move his or her eyes between the bar-code reader and the POS terminal. In this case, it is difficult for the operator to quickly confirm the messages on the display of the POS terminal 200.

The bar-code reader of the present invention has the display unit 46 to display the commodity name, price, etc., of an article whose bar code has been just read. It is easy for the operator to carry out a bar-code reading operation, and at the same time, check messages displayed on the display unit 46.

Upon receiving bar-code data from the bar-code reader 100, the POS terminal 200 retrieves information such as commodity name and price related to the bar-code data from the merchandise file 204. The POS terminal 200 displays the information on the display of-its own, and at the same time, sends the information to the bar-code reader 100. The bar-code reader 100 displays the information on the display unit 46.

The POS terminal 200 or a higher apparatus may send various kinds of information, instructions, and guides to the bar-code reader 100. The bar-code reader 100 displays these pieces of information on the display unit 46, which is easily seen by the operator.

The display unit 46 must not interfere with a laser beam emitted from the laser source or reflected light from a bar code. When the display unit 46 is thick, the bar-code reader must be also thick so that the display unit 46 may not interfere with the emitted and reflected light. To reduce the thickness of the bar-code reader, the display unit 46 must be thin. For example, a liquid crystal panel is preferable for the display unit 46.

Figure 18:
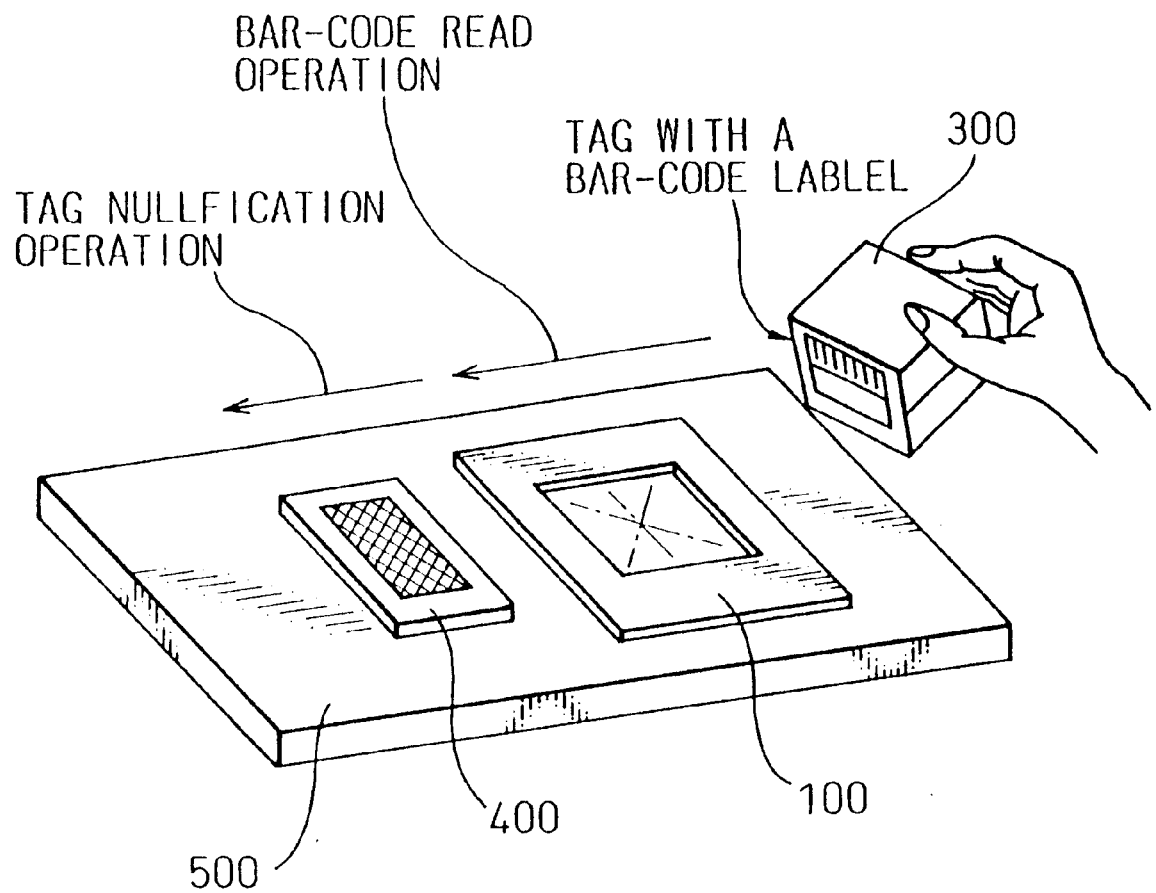
FIG. 18 shows a bar-code reader and a nullification unit separately arranged on a check-out counter according to a prior art.

FIG. 18 shows a check-out counter having a bar-code reader 100 and a tag nullification unit 400 according to a prior art.

To prevent shoplifting, a magnetic tag is attached to each article. If the article is illegally brought out of the shop, a detector at the exit of the shop detects the tag and issues an alarm. After the article is legally purchased, the tag must be nullified. The prior art of FIG. 18 arranges the bar-code reader 100 and tag nullification unit 400 side by side on the check-out counter 500. The nullification unit 400 is selected according to the kind of tags.

An article is passed along the bar-code reader 100 to read the bar code of the article and is moved over the nullification unit 400. Namely, the tag of the article is nullified just after reading the bar code of the article. It is preferable to integrate the bar-code reader 100 and tag nullification unit 400 to save space and cost.

Figure 19A:
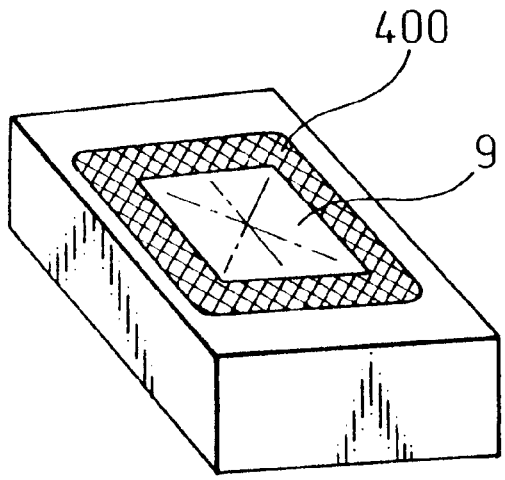
FIGS. 19A and 19B show a bar-code reader with a nullification unit according to a prior art.

FIG. 19A shows a bar-code reader 100 incorporating a tag nullification unit 400 according to a prior art. The bar-code reader 100 has a window 9 around which the nullification unit 400 is arranged. The nullification unit 400 is, for example, a magnet.

This prior art nullifies the tag of an article before scanning the bar code of the article. It is not clear for the operator whether the bar code of the article has been read or only the tag has been nullified. Accordingly, this system is not effective to prevent shoplifting. The nullification unit 400 is too close to the window 9, and the area thereof is too small, so that the nullification operation is difficult.

Figure 19B:
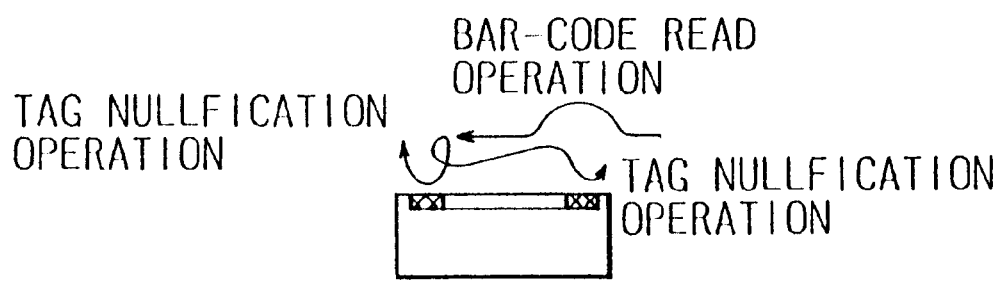

FIG. 19B shows the movements of an article when the bar code thereof is read and the tag thereof is nullified by the bar-code reader of FIG. 19A. To read the bar code, the article must skip the nullification unit 400. After the bar code is read, the article is lowered close to the nullification unit 400. To ensure the nullification of the tag, the article must be repeatedly passed over the nullification unit 400.

Figure 20:
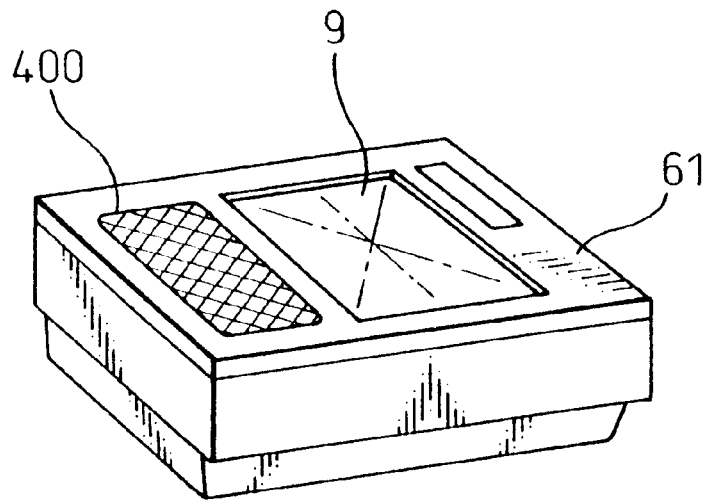
FIG. 20 shows a bar-code reader according to a fifth embodiment of the present invention, having a nullification unit beside a window.

FIG. 20 shows a bar-code reader, according to the fifth embodiment of the present invention, which solves the problem of the prior art. The bar-code reader has a cover 61. In a free space of the cover 61, a tag nullification unit 400 is formed beside a window 9. The window 9 is formed on the right side of the bar-code reader, and the nullification unit 400 is on the left side thereof. The area of the nullification unit 400 is relatively large. An article is first passed above the window 9 and then above the nullification unit 400. Namely, the tag of the article is nullified after the bar code thereof is read.

Figure 21:
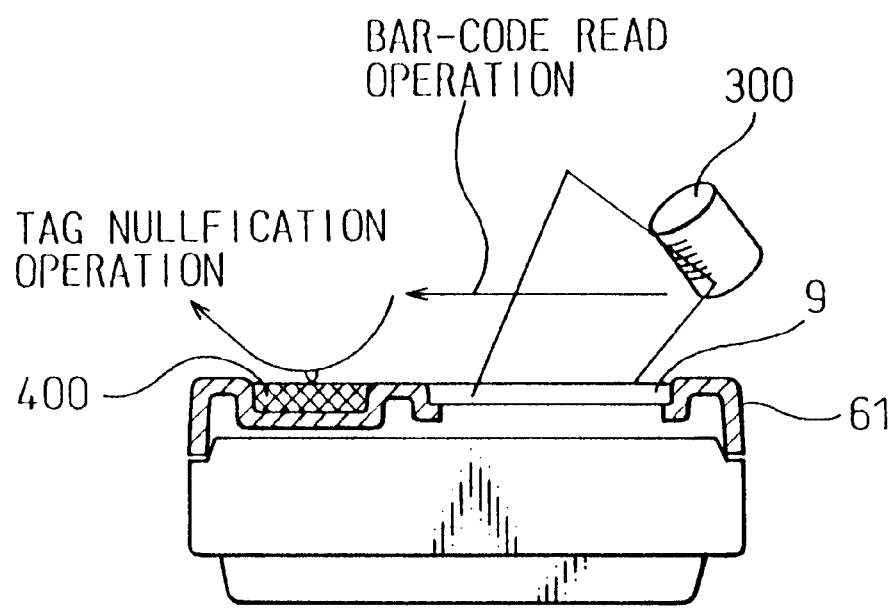
FIG. 21 shows a piece of merchandise moved along the bar-code reader of the fifth embodiment.

FIG. 21 is a side view showing the bar-code reader of FIG. 20. An article 300 is passed above the window 9, to read the bar code thereof. Thereafter, the article 300 is brought close to the nullification unit 400 to nullify the tag thereof. The operator is not required to avoid the nullification unit 400 when reading the bar code, nor to repeatedly pass the article 300 above the nullification unit 400. This results in improving the efficiency of the operator.

Some tags must be touched with the tag nullification unit 400 when they are nullified. On the other hand, an optimum position to read a bar code is slightly away from the window 9 due to the focal point of a scanning beam. In FIG. 21, the article 300 is passed above the window 9 to read the bar code thereof. To nullify the tag of the article 300, the article is lowered so that the tag may be in contact with the nullification unit 400. In this way, the height at which the bar code is read differs from the height at which the tag is nullified. This may deteriorate the efficiency of the operator.

To solve this problem, the height of the nullification unit 400 may be increased to the height where bar codes are read so that the tag of an article is naturally nullified by the nullification unit 400 after the bar code thereof is read.

Figure 22:
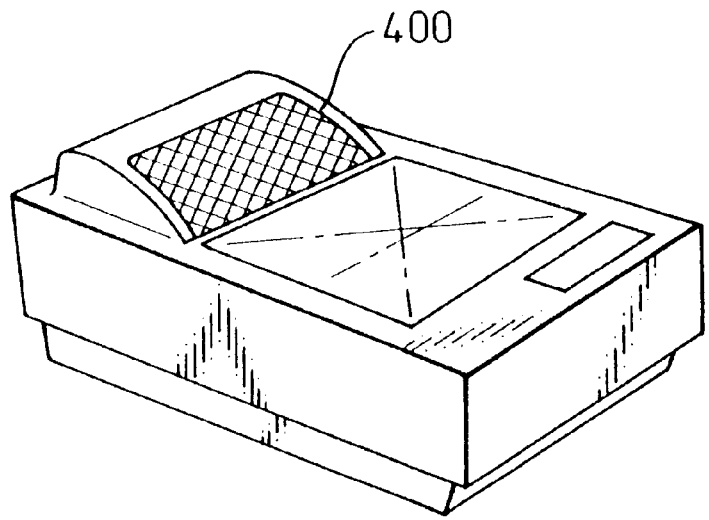
FIG. 22 shows a bar-code reader according to a sixth embodiment of the present invention, having a nullification unit of another type.
Figure 23:
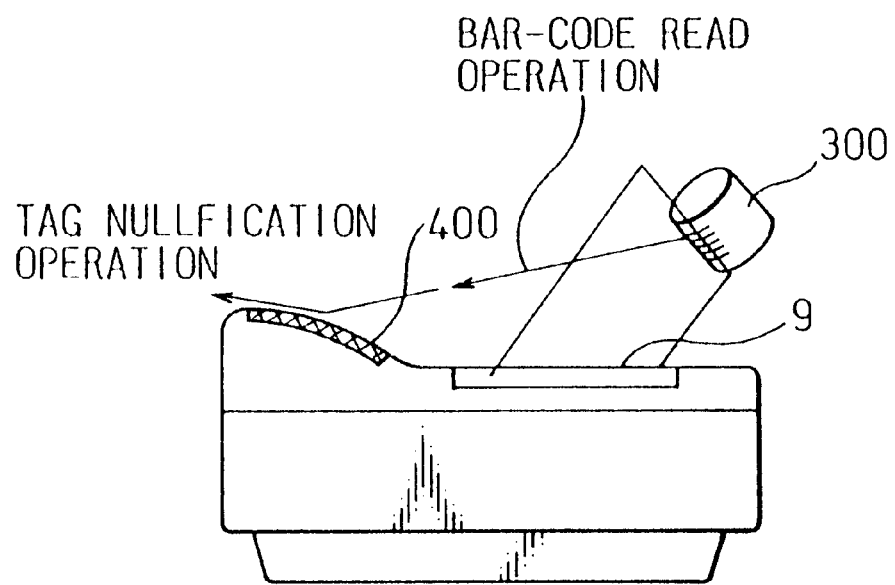
FIG. 23 shows a piece of merchandise moved along the bar-code reader of the sixth embodiment.

FIGS. 22 and 23 show a bar-code reader according to the sixth embodiment of the present invention with a raised tag nullification unit 400. FIG. 22 is a perspective view and FIG. 23 is a side view. The nullification unit 400 is higher than a window of the bar-code reader and is inclined in an article passing direction.

FIG. 23 shows the movement of an article 300 whose bar code is read and whose tag is nullified. The article 300 is moved linearly, downwardly, and obliquely. As a result, the bar code is properly read, and the tag is properly nullified by the nullification unit 400. Since the nullification unit 400 is inclined, the article 300 naturally gets in contact with the nullification unit 400. This results in improving the efficiency of the operator.

In FIG. 23, the height of the nullification unit 400 is fixed. The bar-code reader may have a mechanism for adjusting the inclination and height of the nullification unit 400.

Figure 24:
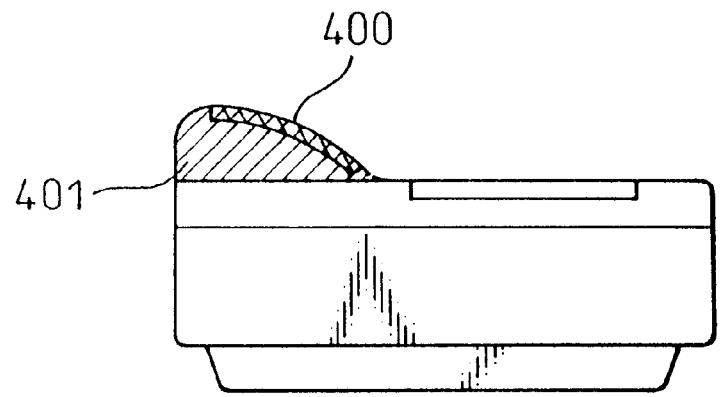
FIG. 24 shows a nullification unit according to a seventh embodiment of the present invention.

FIG. 24 shows a bar-code reader according to the seventh embodiment of the present invention. The bar-code reader has an elastic material 401 such as sponge on which a tag nullification unit 400 is arranged. The elastic material 401 absorbs a shock when an article is touched with the nullification unit 400. For fragile articles, this arrangement prevents the breakage of the articles when their tags are nullified.

Figure 25:
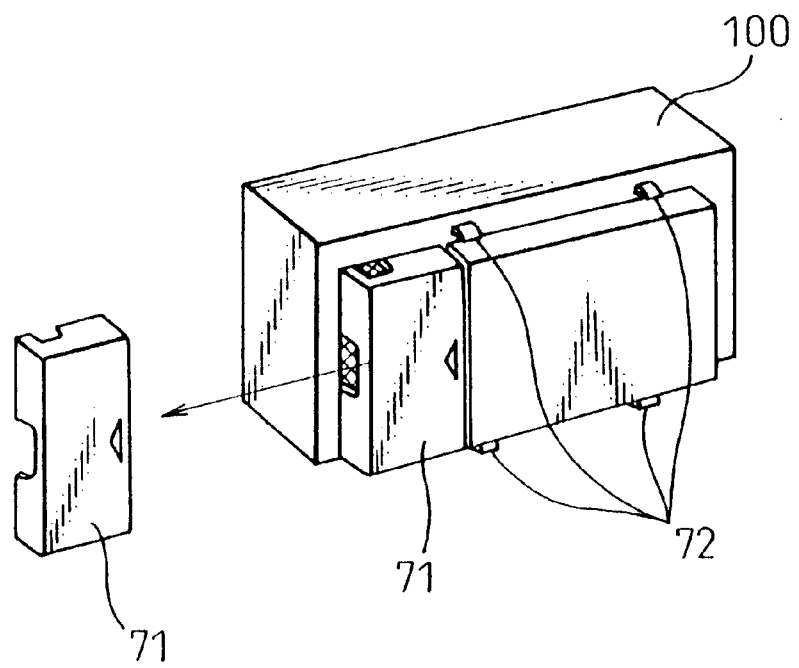
FIG. 25 shows the back of a bar-code reader according to an eighth embodiment of the present invention.

FIG. 25 shows the back of a bar-code reader 100 according to the eighth embodiment of the present invention. The back is provided with a connector to which a cable is connected. The cable is connected to a POS terminal. The back is also provided with an adapter for supplying power to the bar-code reader.

The connector is covered with a cable cover 71 to prevent the cable from catching something or from coming off. The cable cover 71 provides a good appearance.

The bar-code reader 100 may be installed vertically or horizontally. When it is arranged horizontally, a window will be on the right or left side of the operator. To deal with such installation options, the cable cover 71 has three cable holes.

Figure 26:
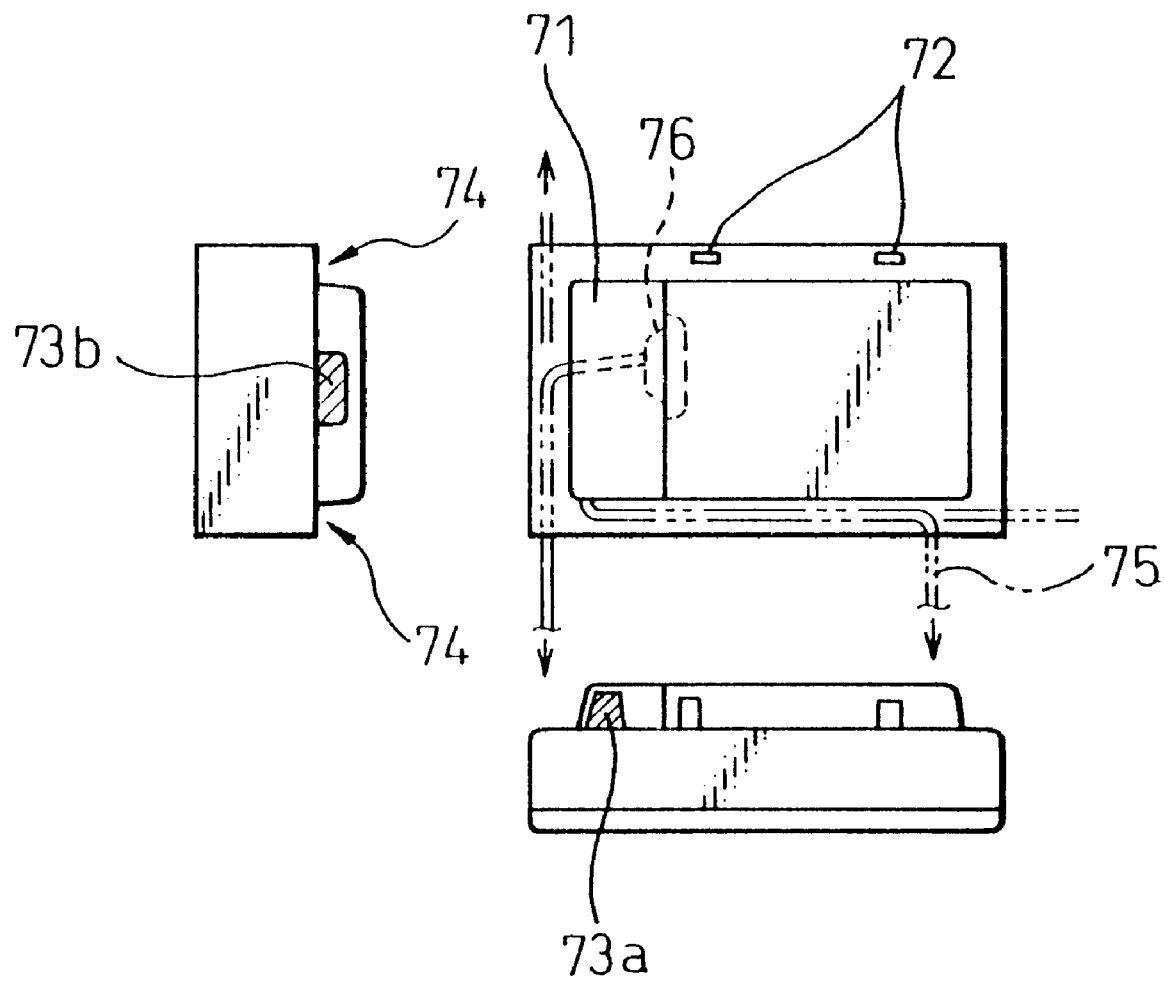
FIG. 26 shows a cable of the bar-code reader of the eighth embodiment.

FIG. 26 shows the bar-code reader of the eighth embodiment with the cable 75 being pulled out of a cable hole 73. When the bar-code reader 100 is vertically arranged, it is preferable to pull the cable 75 from the bottom of the bar-code reader. In this case, the cable 75 may be pulled out of a cable hole 73a on the short side of the cable cover 71. If the bar-code reader is installed such that the cable 75 is hardly pulled out of the bottom, the cable 75 may be pulled out of a cable hole 73b on the long side of the cable cover 71.

When the bar-code reader is vertically arranged, the cable 75 may be pulled out of the cable hole 73a or 73b depending on the situation.

Figure 35:
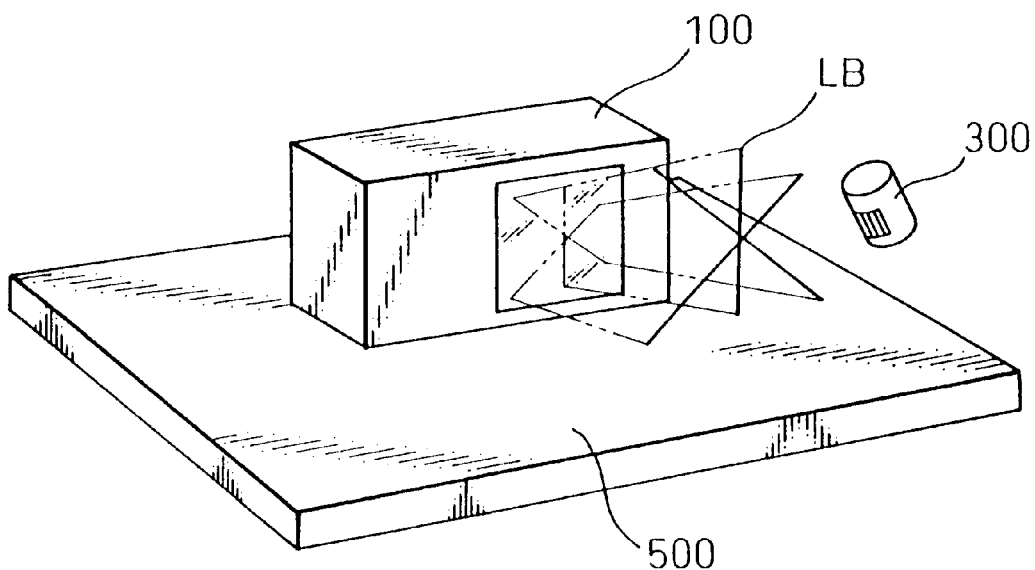
FIG. 35 shows a bar-code reader according to a 12th embodiment of the present invention arranged on a checkout counter.

The bar-code reader according to the present invention may be installed on a check-out counter 500 (FIG. 35). In this case, the cable may deteriorate the outside appearance of the bar-code reader and interfere with the operator. Accordingly, the bar-code reader of FIG. 26 has a space (a recess) 74 on the back of the bar-code reader.

Clips 72 fix the cable in the recess 74. The clips 72 may be integral with the casing of the bar-code reader. The clips 72 prevent the cable from sagging.

Figure 27:
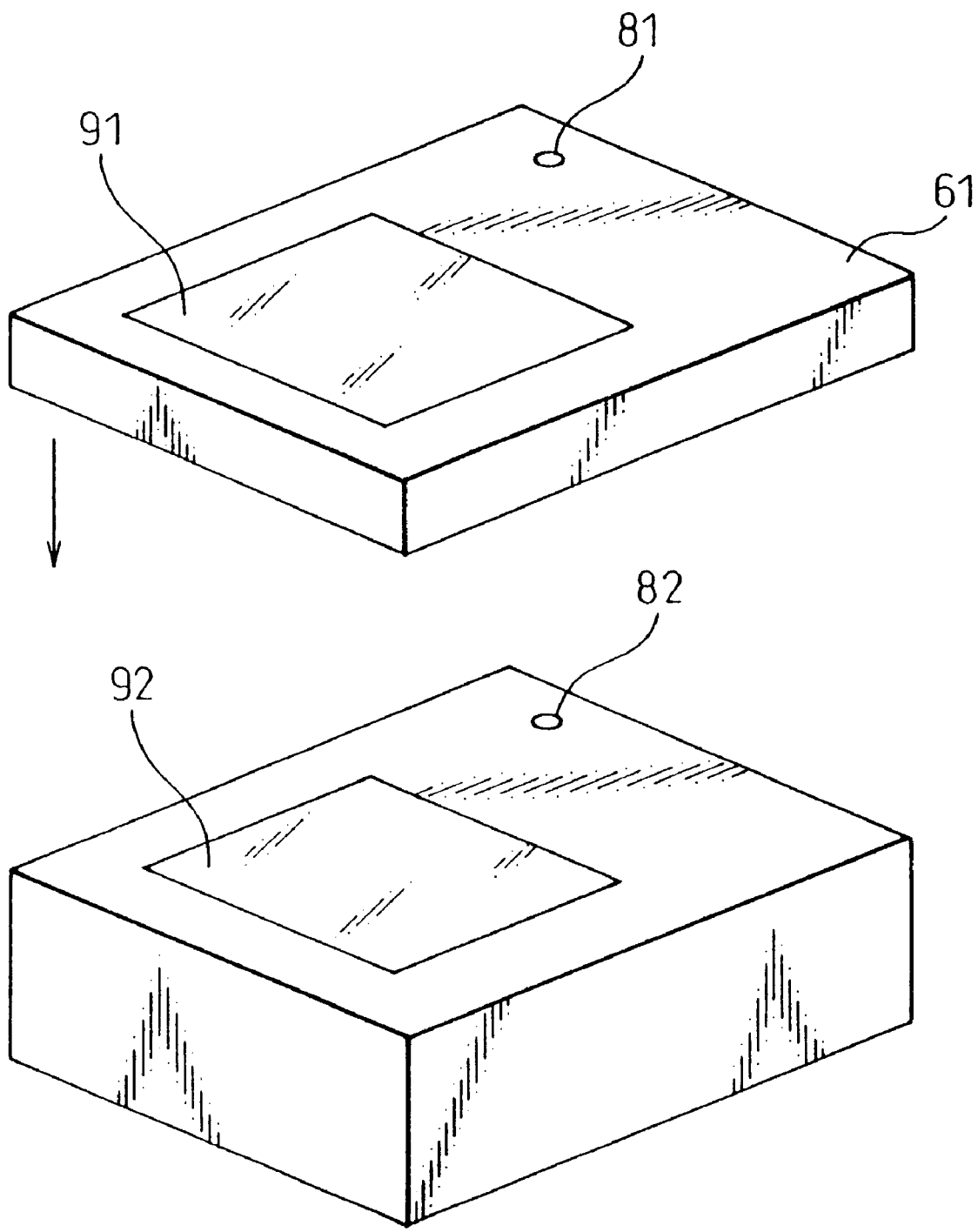
FIG. 27 shows a bar-code reader according to a prior art, having a speaker hole on the surface of the bar-code reader.

FIG. 27 shows a bar-code reader having a speaker hole 82 and a cover 61 having a speaker hole 81 according to a prior art.

After correctly reading a bar code, the bar-code reader emits a sound from a speaker. The speaker is arranged under the speaker holes 81 and 82. The cover 61 has a window 91 corresponding to a window 92 of the bar-code reader. The window 91 protects the window 92 and is replaceable if it is broken.

The cover 61 entirely covers the bar-code reader and has the speaker hole 81 corresponding to the speaker hole 82 of the main body.

These speaker holes 81 and 82 may conduct water inside the bar-code reader. Some articles having bar codes to be read by the bar-code reader may be wet or contain liquid. When reading these articles, water may drop on the bar-code reader and enter the inside thereof through the speaker holes to cause malfunctions in the bar-code reader.

If the speaker hole 81 of the cover 61 is eliminated to prevent such trouble, the volume of sound will be insufficient for the operator.

Figure 28:
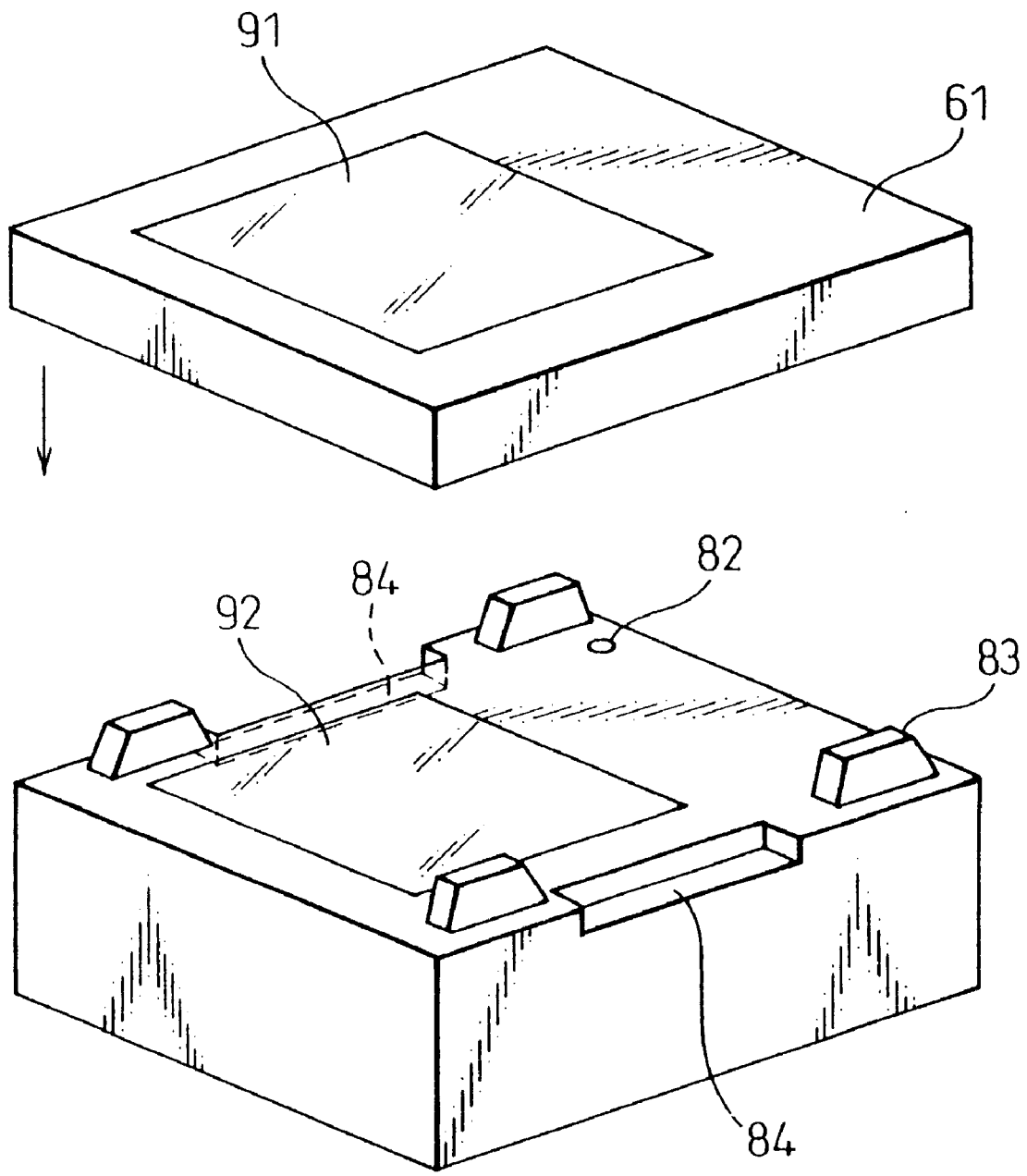
FIG. 28 shows a bar-code reader according to a ninth embodiment of the present invention, having a cover and a buzzer installed on a main body.

FIG. 28 shows a bar-code reader according to the ninth embodiment of the present invention to solve this problem. The bar-code reader is covered with a cover 61. The cover 61 has a glass window 91 and no speaker hole. Accordingly, no water can enter the bar-code reader through the cover 61.

The top of the bar-code reader has a buzzer hole 82 under which a buzzer is arranged. When the buzzer makes a sound, the sound is propagated through the hole 82. The buzzer may be a speaker.

Figure 29:
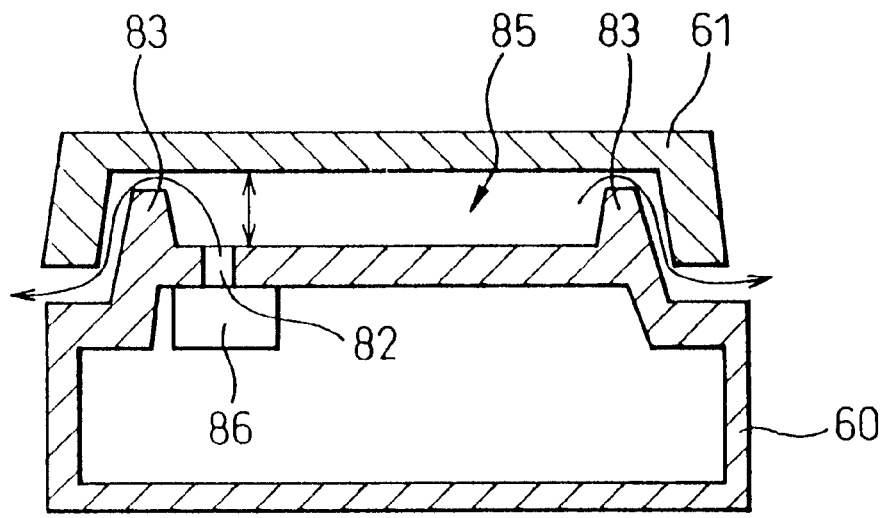
FIG. 29 is a sectional view showing the ninth embodiment.

The volume of the buzzer sound coming through the cover 61 may be insufficient because the cover 61 has no hole. To solve this problem, the bar-code reader of FIG. 28 has a space between the bar-code reader and the cover 61, so that the buzzer sound may resonate in the space. In addition, each side face of the bar-code reader has a step to propagate the buzzer sound outside through a gap formed by the step. FIG. 29 is a side view showing the bar-code reader of FIG. 28.

The top surface of the bar-code reader has four supports 83 for supporting the cover 61 with the space 85 being secured between the bar-code reader and the cover 61. The height of the supports 83 is determined according to the volume of the space 85 required to provide an optimum resonance effect for the frequency of the buzzer sound.

As indicated with arrow marks in FIG. 29, the buzzer sound is propagated through the steps 84 of the bar-code reader. When the bar-code reader is horizontally installed, water will not enter the bar-code reader through the steps 84. When the bar-code reader is vertically installed, the steps 84 are vertically oriented. Even in this posture, water from articles will not enter the bar-code reader through the steps 84 because the articles are passed in front of the bar-code reader.

Figure 30:
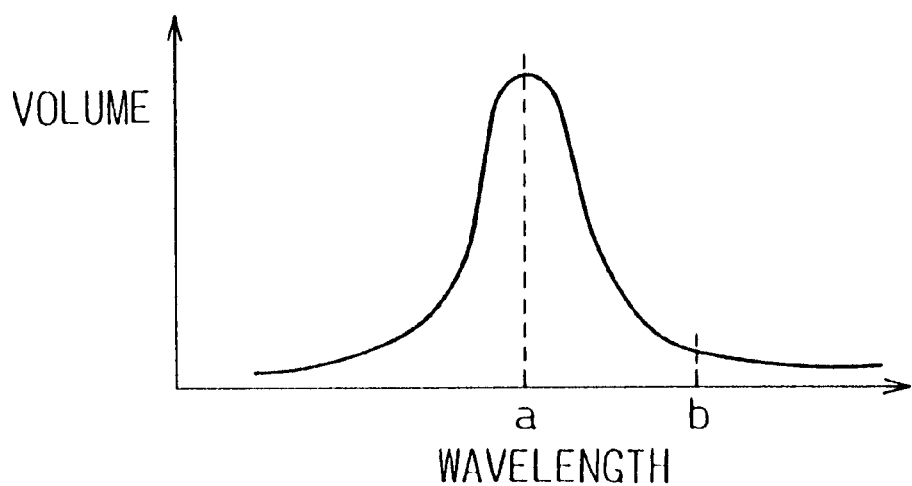
FIG. 30 shows the wavelength characteristic of a buzzer sound of the ninth embodiment.

FIG. 30 shows the relationship between the wavelength (frequency) of a buzzer sound and the volume thereof. The volume reaches a maximum at a predetermined wavelength "a," and before and after the wavelength a, the volume quickly drops.

A shop usually uses many bar-code readers. If they produce buzzer sounds of the same frequency, an operator may not distinguish the buzzer sound of its own from others. If the wavelength of the buzzer sound is changed to "b" in FIG. 30, the volume of the sound will be insufficient for the operator.

To solve this problem, the present invention provides a bar-code reader with buzzers having different wavelength characteristics. The buzzers are switched from one to another according to a request.

Figure 31:
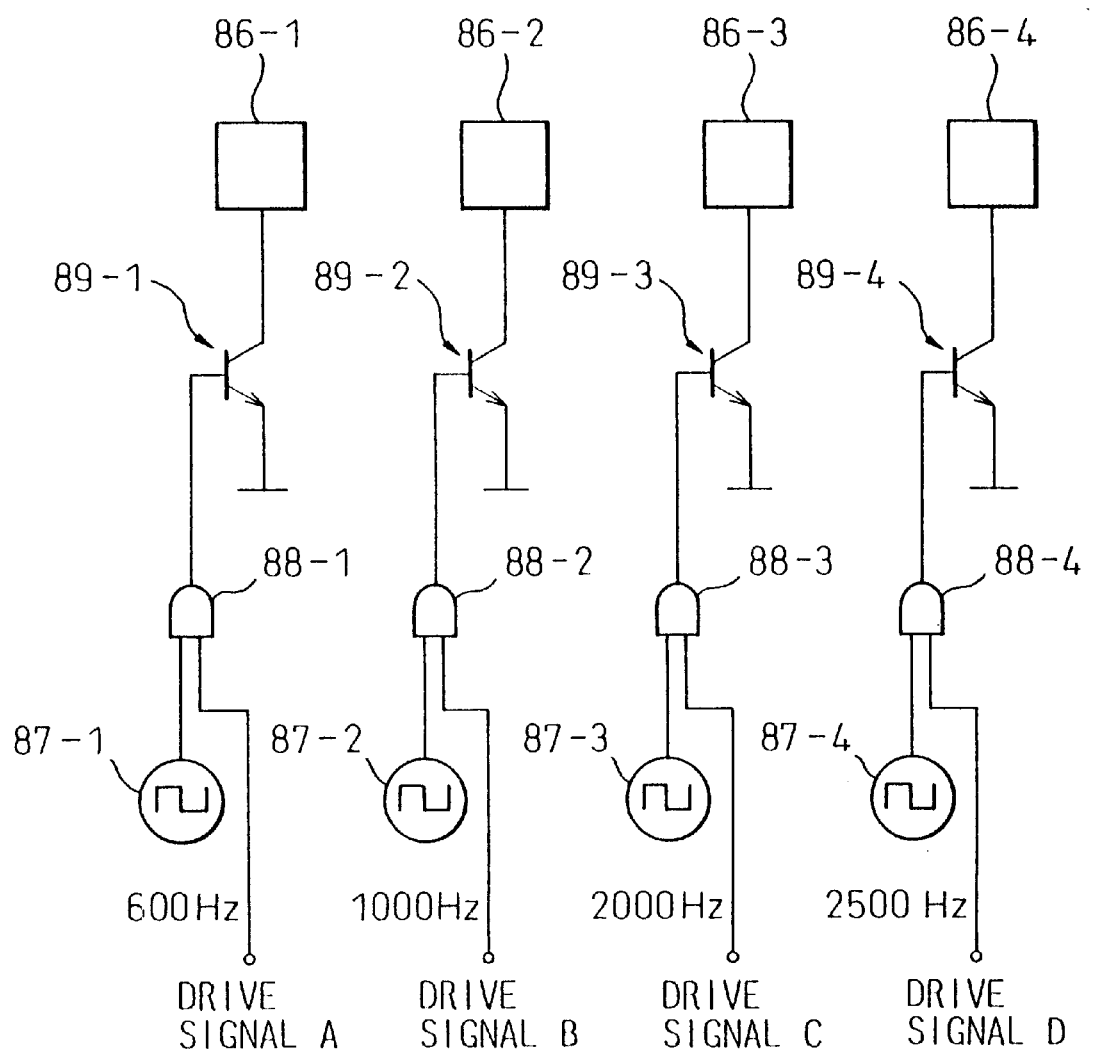
FIG. 31 shows buzzers according to a tenth embodiment of the present invention.
Figure 32:
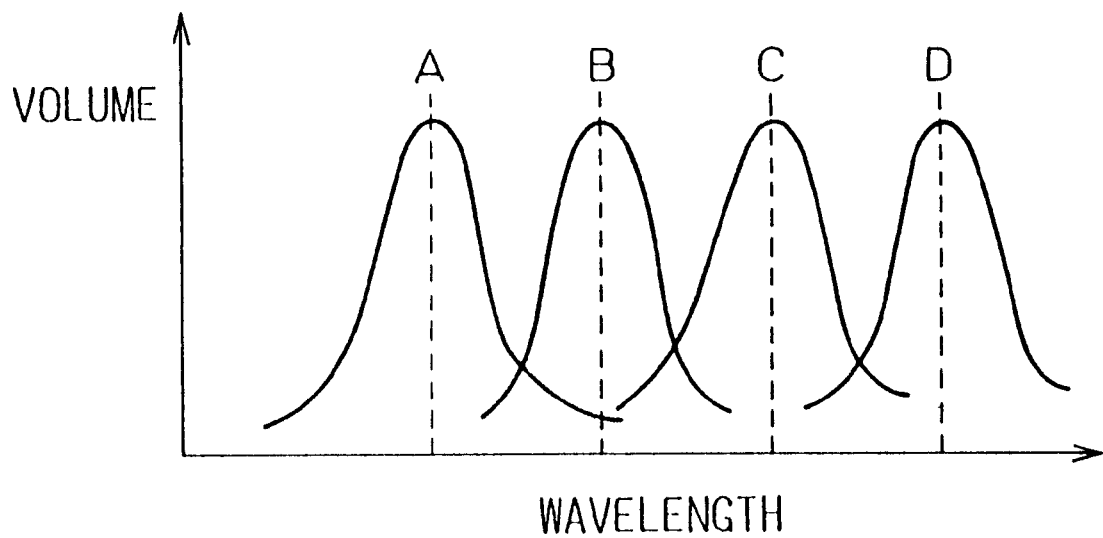
FIG. 32 shows the wavelength characteristics of buzzer sounds according to the tenth embodiment.

FIG. 31 shows a bar-code reader having a plurality of buzzers according to the 10th embodiment of the present invention. FIG. 32 shows the wavelength characteristics of the buzzers. The buzzer 86-1 has a wavelength characteristic A, which is lower than the wavelength characteristic B of the buzzer 86-2. Any one of the buzzers provides a proper volume of sound according to its characteristic curve, so that an operator may clearly hear any one of the sounds.

The number of buzzers is not limited to four. Any number of buzzers may be arranged depending on an installation space. Each buzzer may provide a sufficient volume of sound at its peak wavelength so that the operator may clearly hear it.

Figure 33:
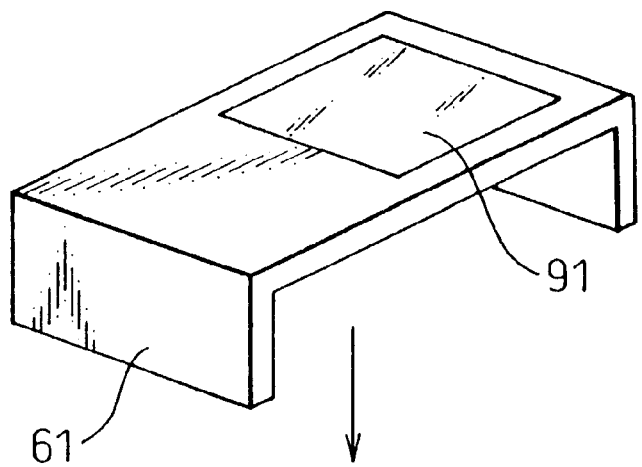
FIG. 33 shows a bar-code reader according to an 11th embodiment of the present invention, having buzzers and a cover.
Figure 33:
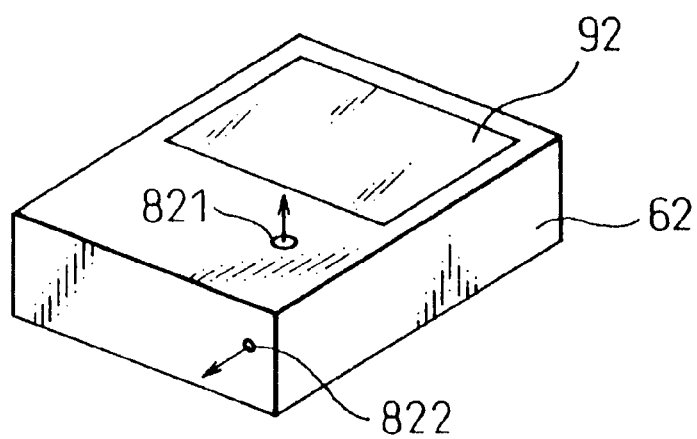
Figure 33:
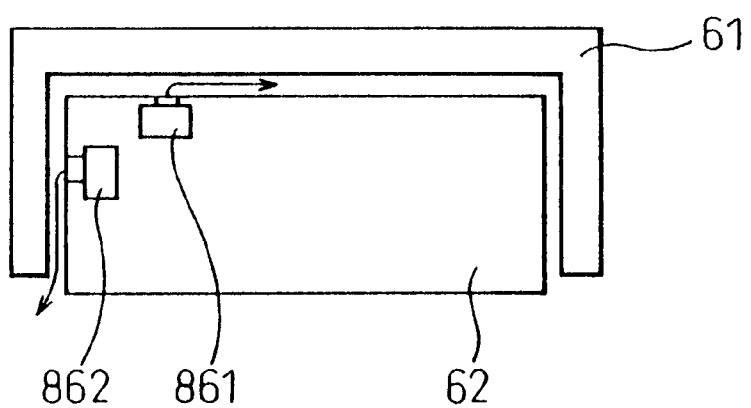

FIG. 33 shows a bar-code reader according to the 11th embodiment. In FIG. 28, the gap between the cover and the body is on the long side of the body. The gap may be blocked by a check-out counter depending on the installation conditions of the bar-code reader. If the gap is blocked, a buzzer sound will not be propagated outside. The 11th embodiment solves this problem.

The bar-code reader of FIG. 33 has a buzzer 86-1 whose sound is propagated upward as well as a buzzer 86-2 whose sound is propagated sideward. A cover 61 of this bar-code reader is channel-shaped.

Figure 34:
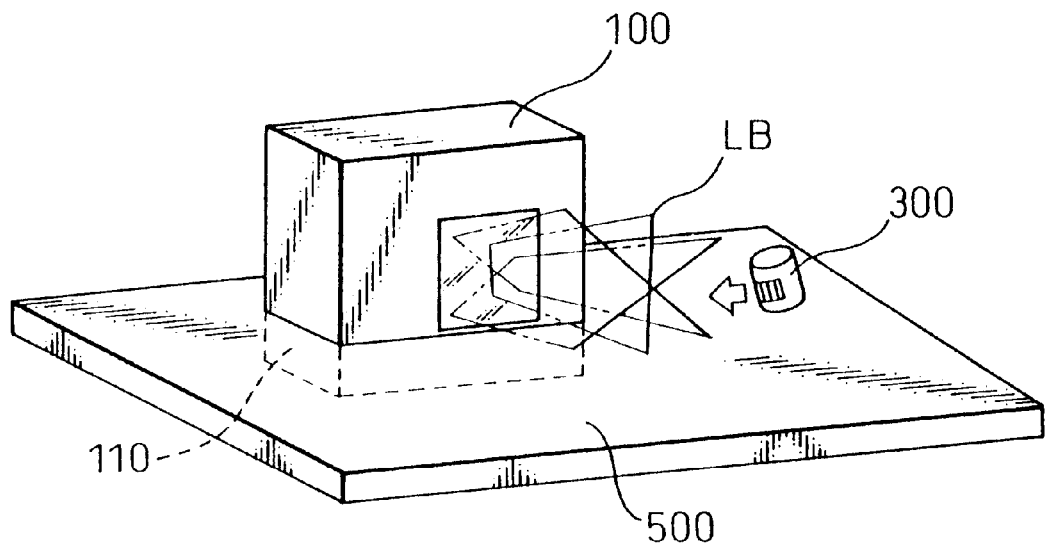
FIG. 34 shows a bar-code reader according to a prior art arranged on a check-out counter.

FIG. 34 shows the bar-code reader of FIG. 1 of the prior art installed on a check-out counter 500. The window of the bar-code reader is tall, and therefore, part of the bar-code reader must be embedded in the check-out counter 500.

FIG. 35 shows a bar-code reader according to the 12th embodiment of the present invention. This bar-code reader is low, and therefore, it is convenient to use without embedding the same in a check-out counter 500. To easily read a bar code, the scanning range of a scan beam must be wide to cross the check-out counter 500. Since the bar-code reader is low, the scan beam thereof easily crosses the check-out counter 500. Accordingly, a bar code of an article is surely read only by passing the article on the check-out counter in front of the bar-code reader.

Figure 36A:
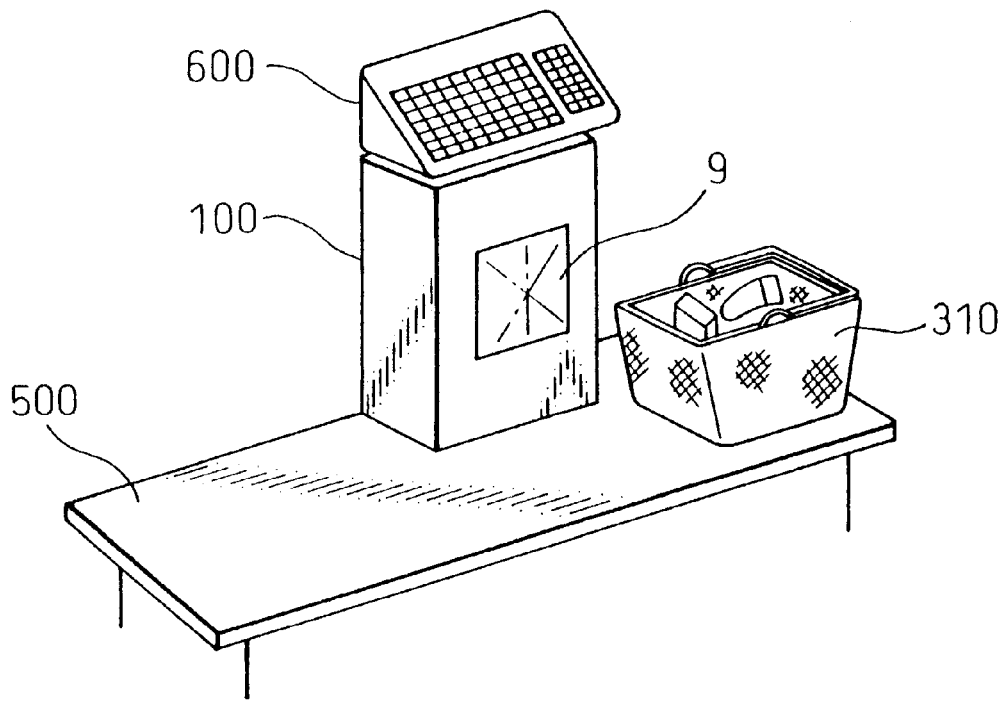
FIGS. 36A and 36B show a POS terminal according to a prior art.
Figure 36B:
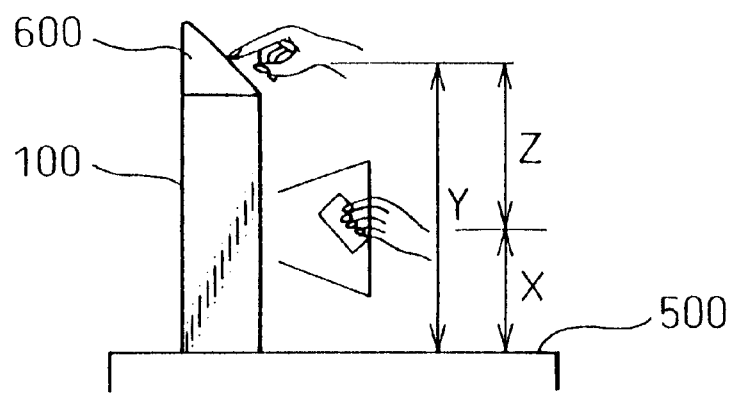
Figure 37A:
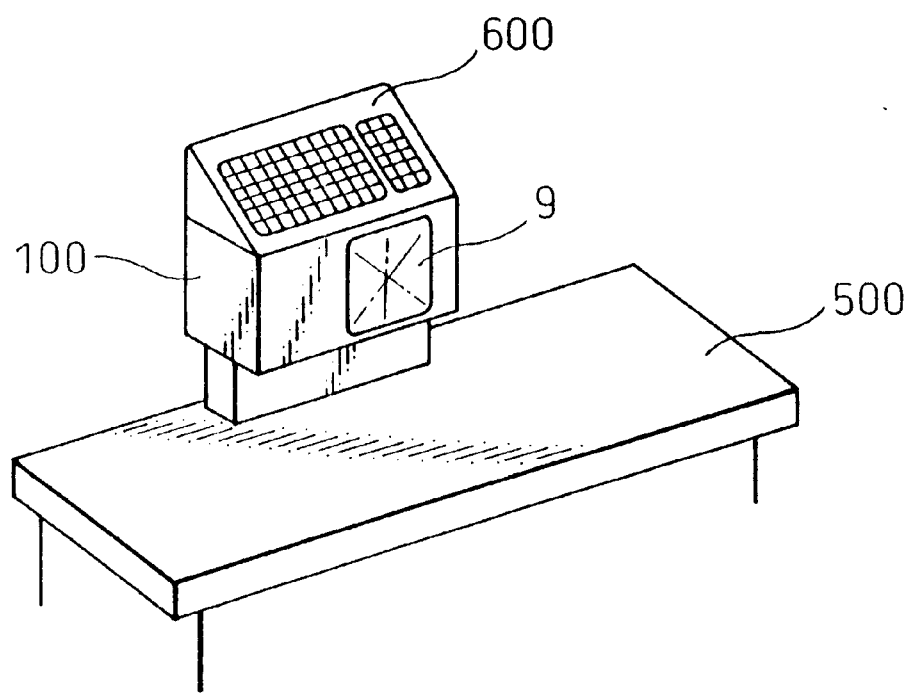
FIGS. 37A and 37B show a POS terminal according to a 13th embodiment of the present invention.
Figure 37B:
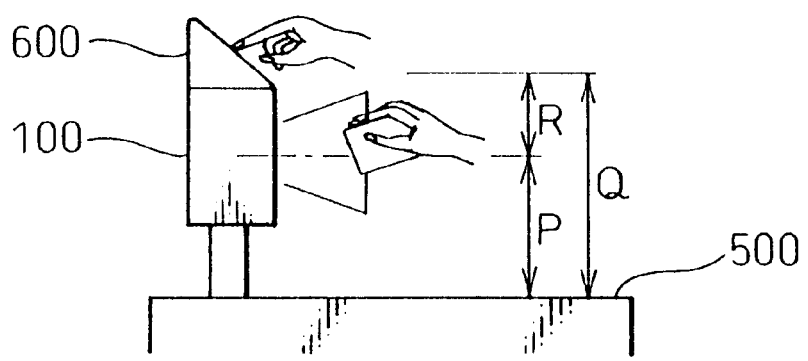

FIGS. 36A and 36B show a bar-code reader on which a keyboard is placed according to a prior art, and FIGS. 37A and 37B show a bar-code reader on which a keyboard is placed according to the 13th embodiment of the present invention.

The bar-code reader of the prior art is tall, and the top thereof is spaced away from a window thereof. Accordingly, the difference Z between the height X where a bar code is read and the height Y where the keyboard is manipulated is large. To touch the keyboard, the operator must extend his or her hands above the bar-code reading position. This is laborious for the operator.

On the other hand, the bar-code reader of the POS terminal of the 12th embodiment of FIGS. 37A and 37B is low. The difference R between the window and top of the bar-code reader is small. Accordingly, the operator may easily reach the keyboard on the bar-code reader.

As explained above, the present invention provides a bar-code reader having a laser source, photosensor, and condensing lens that are unitized. The unit requires no adjustments of respective parts and suffers no accident due to static electricity when it is replaced.

The photosensor is closer to the condensing lens from the focal point of the condensing lens, to stably read bar codes irrespective of the positions of the bar codes.

The bar-code reader has a space to insert a memo. The bar-code reader may have a display unit for displaying information in response to instructions from a higher apparatus. The memo space and display unit are easy to see and are used to indicate merchandise information. The display unit is useful to display timely information necessary for the operator.

A tag nullification unit is arranged beside a window of the bar-code reader, to nullify the tag of an article after reading the bar code thereof. The nullification unit is higher than the window, so that articles are linearly moved for the bar-code reading and tag nullification operations. The nullification unit may be obliquely raised with respect to the window, to nullify the tag of an article after reading the bar code thereof through natural movements. The nullification unit may be installed on an elastic material to absorb a shock on the nullification unit when an article is brought in contact with the nullification unit. This prevents the breakage of the article.

The bar-code reader has a connector covered with a cable cover to prevent a cable connected to the connector from coming off. The cable cover has a plurality of cable holes so that the cable is always properly pulled out of the cable cover irrespective of the setting situation of the bar-code reader. The back of the bar-code reader may have a recess to receive the cable, as well as fittings to neatly fix the cable and prevent the sagging of the cable.

A buzzer sound produced by the bar-code reader resonates between the top surface of the bar-code reader and a cover. The top surface of the bar-code reader and the cover have no buzzer holes, and the side face of the bar-code reader has an opening to secure a required volume of buzzer sound. The bar-code reader may have a plurality of buzzers having different sounds, so that the sound of each bar-code reader is distinguishable from any others.

What is claimed is:

1. A replaceable emission-condensing unit for a bar code reader including scan means having reflecting surfaces, the scan means for scanning a bar code with a laser beam according to a predetermined scanning pattern, the bar code reader also having a window for passing the laser beam from the scan means toward the bar code that is present or being moved in the vicinity of the window, said replaceable emission-condensing unit comprising:

a laser source for emitting said laser beam;

condensing means for condensing reflected light returned from the bar code which passes through the window and is reflected by the reflecting surfaces of said scan means along a route traced by the laser beam; and a photosensor for detecting the condensed light and providing an electric signal in proportion to an intensity of the detected light, wherein said replaceable emission-condensing unit integrally incorporates said laser source, said condensing means and said photosensor, configured to be mechanically correctly installed in the bar code reader, and wherein the scan means is separate from said replaceable emission-condensing unit.

2. A replaceable emission-condensing unit according to claim 1, further comprising a pair of mirrors which align an optical axis of the laser beam onto an optical axis of the reflected light.

* * * * *